US012010776B2

(12) United States Patent
Miller et al.

(10) Patent No.: US 12,010,776 B2
(45) Date of Patent: Jun. 11, 2024

(54) SYSTEMS AND METHODS FOR LIGHTED SHOWERING

(71) Applicant: Kohler Co., Kohler, WI (US)

(72) Inventors: Brandon H. Miller, Sheboygan, WI (US); Connor McManus, Sheboygan, WI (US); Brian M. Kaule, Sheboygan, WI (US)

(73) Assignee: KOHLER CO.

( * ) Notice: Subject to any disclaimer, the term of this patent is extended or adjusted under 35 U.S.C. 154(b) by 0 days.

(21) Appl. No.: 18/165,079

(22) Filed: Feb. 6, 2023

(65) Prior Publication Data

US 2023/0189417 A1 Jun. 15, 2023

Related U.S. Application Data

(63) Continuation of application No. 17/121,057, filed on Dec. 14, 2020, now Pat. No. 11,602,032.

(60) Provisional application No. 62/951,974, filed on Dec. 20, 2019.

(51) Int. Cl.

| | |
|---|---|
| ***H05B 47/105*** | (2020.01) |
| ***B05B 1/18*** | (2006.01) |
| ***F21V 3/00*** | (2015.01) |
| ***F21V 7/00*** | (2006.01) |
| ***F21V 33/00*** | (2006.01) |

(52) U.S. Cl.

CPC ........... *H05B 47/105* (2020.01); *B05B 1/185* (2013.01); *F21V 3/00* (2013.01); *F21V 7/0008* (2013.01); *F21V 33/004* (2013.01)

(58) Field of Classification Search

CPC ....... H05B 47/105; F21V 3/00; F21V 7/0008; F21V 33/004; B05B 1/185

See application file for complete search history.

(56) References Cited

U.S. PATENT DOCUMENTS

| | | | |
|---|---|---|---|
| 491,475 | A | 2/1893 | Elliott |
| 492,999 | A | 3/1893 | Trouve |
| 519,581 | A | 5/1894 | Langdon |
| 522,279 | A | 7/1894 | Whitfield |
| 557,263 | A | 3/1896 | Gilmore et al. |
| 602,196 | A | 4/1898 | Ralston |
| 612,629 | A | 10/1898 | Ihlder |

(Continued)

FOREIGN PATENT DOCUMENTS

| | | | | |
|---|---|---|---|---|
| CN | 1293743 | A | | 5/2001 |
| CN | 2557238 | Y | * | 6/2003 |

(Continued)

OTHER PUBLICATIONS

Final Office Action on U.S. Appl. No. 17/121,057 dated Aug. 26, 2022.

(Continued)

*Primary Examiner* — Erin Kryukova

(74) *Attorney, Agent, or Firm* — FOLEY & LARDNER LLP

(57) ABSTRACT

A showerhead includes a plurality of water outlets for providing a flow of water. The showerhead includes one or more lighting elements and a light driver communicably coupled to the one or more lighting elements. The light driver is configured to control at least a subset of the lighting elements to output light based on various conditions corresponding to the showerhead.

18 Claims, 16 Drawing Sheets

(56) References Cited

U.S. PATENT DOCUMENTS

| | | | |
|---|---|---|---|
| 1,039,363 | A | 9/1912 | Chapin |
| 1,225,865 | A | 5/1917 | Schneible |
| 1,728,456 | A | 9/1929 | Max |
| 1,802,082 | A | 8/1931 | Mclain |
| 1,818,319 | A | 8/1931 | Henry |
| 1,837,732 | A | 12/1931 | Robinson |
| 1,839,994 | A | 1/1932 | Proffatt |
| 1,848,179 | A | 3/1932 | Kiester |
| 1,924,150 | A | 8/1933 | Browne |
| 1,934,587 | A | 11/1933 | Browne |
| 2,005,251 | A | 6/1935 | Wood |
| 2,005,602 | A | 6/1935 | Thomson |
| 2,034,792 | A | 3/1936 | Bergman |
| 2,052,404 | A | 8/1936 | Kearsley |
| 2,071,242 | A | 2/1937 | Todd |
| 2,105,632 | A | 1/1938 | Bernesser |
| 2,160,474 | A | 5/1939 | Jones et al. |
| 2,330,592 | A | 9/1943 | Kendrick |
| 2,477,984 | A | 8/1949 | Jackson |
| 2,593,517 | A | 4/1952 | Angulo |
| 2,623,367 | A | 12/1952 | Morrison |
| 2,687,915 | A | 8/1954 | Keech |
| 2,726,116 | A | 12/1955 | Barber |
| 2,726,117 | A | 12/1955 | Barber |
| 2,883,114 | A | 4/1959 | Horvath |
| 2,900,111 | A | 8/1959 | Scheurer |
| 3,104,815 | A | 9/1963 | Schultz |
| 3,702,172 | A | 11/1972 | Hawkins |
| 3,838,816 | A | 10/1974 | Huff et al. |
| 3,845,291 | A | 10/1974 | Portyrata |
| 3,866,832 | A | 2/1975 | Noguchi |
| 3,894,689 | A | 7/1975 | Billingsley |
| 4,408,717 | A | 10/1983 | Rynberk |
| 4,564,889 | A | 1/1986 | Bolson |
| 4,616,298 | A | 10/1986 | Bolson |
| 4,749,126 | A | 6/1988 | Kessener et al. |
| 4,849,098 | A | 7/1989 | Wilcock et al. |
| 4,899,057 | A | 2/1990 | Koji |
| 4,901,922 | A | 2/1990 | Kessener et al. |
| 4,924,361 | A | 5/1990 | Von Kohorn |
| 4,945,675 | A | 8/1990 | Kendrick |
| 4,975,811 | A | 12/1990 | Fraser et al. |
| 5,152,210 | A | 10/1992 | Chen |
| 5,160,086 | A | 11/1992 | Kuykendal et al. |
| 5,163,615 | A | 11/1992 | Bauer |
| 5,165,580 | A | 11/1992 | Rosenthal |
| 5,165,777 | A | 11/1992 | Kira |
| 5,171,429 | A | 12/1992 | Yasuo |
| 5,195,819 | A | 3/1993 | Chaut et al. |
| 5,207,499 | A | 5/1993 | Vajda |
| 5,211,469 | A | 5/1993 | Matthias et al. |
| 5,222,796 | A | 6/1993 | Shneider |
| 5,234,728 | A | 8/1993 | Chiang |
| 5,288,018 | A | 2/1994 | Chikazumi |
| 5,333,639 | A | 8/1994 | Nelson |
| 5,400,820 | A | 3/1995 | Orth |
| 5,439,170 | A | 8/1995 | Dach |
| 5,491,617 | A | 2/1996 | Currie |
| 5,678,617 | A | 10/1997 | Kuykendal et al. |
| 5,795,053 | A | 8/1998 | Pierce |
| 5,823,431 | A | 10/1998 | Pierce |
| 5,873,647 | A | 2/1999 | Kurtz et al. |
| 5,931,382 | A | 8/1999 | Gross et al. |
| 6,021,960 | A | 2/2000 | Kehat |
| 6,030,108 | A | 2/2000 | Ishiharada et al. |
| 6,036,333 | A | 3/2000 | Spiller |
| 6,076,741 | A | 6/2000 | Dandrel et al. |
| 6,093,313 | A | 7/2000 | Bovaird et al. |
| 6,126,290 | A | 10/2000 | Veigel |
| 6,132,056 | A | 10/2000 | Ruthenberg |
| 6,149,070 | A | 11/2000 | Hones |
| 6,152,381 | A | 11/2000 | Hones |
| 6,196,471 | B1 | 3/2001 | Ruthenberg |
| 6,269,491 | B2 | 8/2001 | Zankow |
| 6,276,612 | B1 | 8/2001 | Hall |
| 6,375,090 | B1 | 4/2002 | Beidokhti |
| 6,375,342 | B1 | 4/2002 | Koren et al. |
| 6,382,520 | B1 | 5/2002 | Hones |
| 6,393,192 | B1 | 5/2002 | Koren |
| 6,439,472 | B1 | 8/2002 | Lin et al. |
| 6,447,137 | B1 | 9/2002 | Long |
| 6,453,484 | B1 | 9/2002 | Pinciaro |
| 6,484,952 | B2 | 11/2002 | Koren |
| 6,494,107 | B1 | 12/2002 | Kazazian |
| 6,519,790 | B2 | 2/2003 | Ko |
| 6,543,925 | B2 | 4/2003 | Kuykendal et al. |
| 6,601,247 | B2 | 8/2003 | Shimizu |
| 6,607,144 | B1 | 8/2003 | Yen |
| 6,634,762 | B2 | 10/2003 | Cilia |
| 6,637,676 | B2 | 10/2003 | Zieger et al. |
| 6,641,056 | B2 | 11/2003 | Kuykendal et al. |
| 6,644,561 | B1 | 11/2003 | Daane |
| 6,685,890 | B1 | 2/2004 | Van Remmen |
| 6,731,429 | B2 | 5/2004 | Lunde |
| 6,742,725 | B1 | 6/2004 | Fan |
| 6,755,349 | B2 | 6/2004 | Beidokhti |
| 6,761,323 | B2 | 7/2004 | Hsieh |
| 6,774,584 | B2 | 8/2004 | Lys et al. |
| 6,779,739 | B2 | 8/2004 | Mulvaney |
| 6,781,329 | B2 | 8/2004 | Mueller et al. |
| 6,786,621 | B2 | 9/2004 | Sviland |
| 6,805,458 | B2 | 10/2004 | Schindler et al. |
| 6,857,582 | B1 | 2/2005 | Wang |
| 6,869,204 | B2 | 3/2005 | Morgan et al. |
| 6,877,171 | B2 | 4/2005 | Shimizu |
| 6,901,925 | B2 | 6/2005 | Coughlin |
| 6,926,426 | B2 | 8/2005 | Currie et al. |
| 6,936,978 | B2 | 8/2005 | Morgan et al. |
| 6,967,448 | B2 | 11/2005 | Morgan et al. |
| 6,981,652 | B2 | 1/2006 | Lin |
| 6,983,898 | B2 | 1/2006 | Clark |
| 7,008,073 | B2 | 3/2006 | Stuhlmacher, II |
| 7,048,210 | B2 | 5/2006 | Clark |
| 7,114,821 | B2 | 10/2006 | Currie et al. |
| 7,124,452 | B1 | 10/2006 | Bauza |
| 7,162,752 | B2 | 1/2007 | McDonald et al. |
| 7,178,746 | B2 | 2/2007 | Gross |
| 7,182,477 | B1 | 2/2007 | Hartz |
| 7,187,141 | B2 | 3/2007 | Mueller et al. |
| 7,191,956 | B2 | 3/2007 | Lin |
| 7,194,774 | B2 | 3/2007 | Bergstrom |
| 7,222,820 | B2 | 5/2007 | Wentland et al. |
| 7,228,874 | B2 | 6/2007 | Bolderheij et al. |
| 7,229,027 | B2 | 6/2007 | Ehresman et al. |
| 7,254,847 | B2 | 8/2007 | Kunkel |
| 7,264,176 | B2 | 9/2007 | Johnson |
| 7,270,748 | B1 | 9/2007 | Lieggi |
| 7,303,299 | B2 | 12/2007 | Theus |
| 7,303,300 | B2 | 12/2007 | Dowling et al. |
| 7,309,136 | B2 | 12/2007 | Lei |
| 7,316,359 | B2 | 1/2008 | Beidokhti |
| 7,340,914 | B2 | 3/2008 | Bowen et al. |
| 7,360,913 | B2 | 4/2008 | Currie |
| 7,377,661 | B2 | 5/2008 | Douglass |
| 7,384,165 | B2 | 6/2008 | Doyle |
| 7,387,401 | B2 | 6/2008 | Clark |
| 7,392,552 | B2 | 7/2008 | Lu |
| 7,404,649 | B2 | 7/2008 | Gosis et al. |
| 7,406,722 | B2 | 8/2008 | Fukuizumi et al. |
| 7,422,342 | B2 | 9/2008 | Nanni et al. |
| 7,427,840 | B2 | 9/2008 | Morgan et al. |
| 7,434,960 | B2 | 10/2008 | Stuhlmacher et al. |
| 7,467,874 | B2 | 12/2008 | Gautschi et al. |
| 7,472,430 | B2 | 1/2009 | McDonald et al. |
| 7,482,764 | B2 | 1/2009 | Morgan et al. |
| 7,520,628 | B1 | 4/2009 | Sloan et al. |
| 7,537,175 | B2 | 5/2009 | Miura et al. |
| 7,553,076 | B2 | 6/2009 | An |
| 7,571,867 | B2 | 8/2009 | Hu |
| 7,587,910 | B2 | 9/2009 | Bowen |
| 7,607,789 | B2 | 10/2009 | Lu et al. |
| 7,617,698 | B2 | 11/2009 | Bowen et al. |
| 7,652,436 | B2 | 1/2010 | Dowling et al. |
| 7,677,748 | B2 | 3/2010 | Hou et al. |

(56) References Cited

U.S. PATENT DOCUMENTS 7,690,395 B2 4/2010 Jonte et al.
7,690,533 B2 4/2010 Stilley
7,698,754 B2 4/2010 Kunkel
7,703,297 B2 4/2010 Bowen et al.
7,726,832 B2 6/2010 Clark
7,744,013 B2 6/2010 Johnson
7,753,545 B2 7/2010 Groover
7,775,457 B2 8/2010 Schnuckle
7,794,095 B2 9/2010 Gautschi et al.
7,810,942 B2 10/2010 Kunkel et al.
7,815,329 B2 10/2010 Scali et al.
7,819,541 B2 10/2010 Kunkel
7,823,801 B2 11/2010 McGarry et al.
7,841,732 B2 11/2010 Coushaine et al.
7,845,579 B2 12/2010 Johnson
7,850,323 B2 12/2010 Keiper et al.
7,867,172 B1 1/2011 Baruti et al.
7,889,187 B2 2/2011 Freier et al.
7,931,382 B2 4/2011 Hecht
7,932,482 B2 4/2011 Norwood et al.
7,937,784 B2 5/2011 Qiu
7,941,877 B2 5/2011 Gardenier et al.
7,966,677 B2 6/2011 Miller et al.
7,980,089 B2 7/2011 Bowen et al.
8,011,604 B1 9/2011 Holtsnider
8,020,787 B2 9/2011 Leber
8,028,355 B2 10/2011 Reeder et al.
8,042,748 B2 10/2011 Hagaman
8,042,962 B2 10/2011 Fuentes et al.
8,070,075 B2 12/2011 Schmidt et al.
8,079,726 B1 12/2011 Hui et al.
8,100,547 B2 1/2012 Hogh et al.
8,109,301 B1 2/2012 Denise
8,109,645 B2 2/2012 Liao
8,122,528 B2 2/2012 Heisterhagen
8,127,782 B2 3/2012 Jonte et al.
8,214,935 B2 7/2012 Colin
8,215,569 B2 7/2012 Johnson
8,307,472 B1 11/2012 Saxon et al.
8,360,590 B2 1/2013 Carter
8,403,520 B2 3/2013 Liao et al.
8,408,728 B2 4/2013 Fuentes et al.
8,421,032 B2 4/2013 Dornseifer
8,438,672 B2 5/2013 Reeder et al.
8,459,819 B2 6/2013 Martindale et al.
8,479,765 B1 7/2013 Wren
8,505,593 B1 8/2013 Denise
8,522,372 B1 9/2013 Lafon et al.
8,523,087 B2 9/2013 Hagaman
8,528,579 B2 9/2013 Jonte et al.
8,550,643 B2 10/2013 Kownacki et al.
8,578,884 B2 11/2013 Hawk
8,590,072 B2 11/2013 Brunner et al.
8,616,470 B2 12/2013 Williams
8,636,227 B2 1/2014 Johnson
8,662,418 B1 3/2014 Ferrante
8,665,673 B2 3/2014 Zhou et al.
8,667,623 B2 3/2014 Paget
8,668,348 B2 3/2014 Hui et al.
D702,379 S 4/2014 Shaffer
8,686,586 B1 4/2014 Tsai
8,708,257 B2 4/2014 Gautschi et al.
8,733,675 B2 5/2014 Leber
8,763,925 B2 7/2014 Johnson
8,844,311 B2 9/2014 Bowen et al.
8,844,564 B2 9/2014 Jonte et al.
8,893,320 B2 11/2014 Klicpera
8,905,152 B2 12/2014 Kling et al.
8,911,100 B2 12/2014 Tsai
8,919,979 B2 12/2014 Mabry et al.
9,032,565 B2 5/2015 Loeck et al.
9,045,327 B2 6/2015 Gormley et al.
9,046,261 B2 6/2015 Zhang et al.
9,057,184 B2 6/2015 Meehan et al.
9,061,294 B2 6/2015 Kajuch et al.
9,085,880 B2 7/2015 Hanna et al.
9,095,862 B2 8/2015 Hanna et al.
9,149,817 B2 10/2015 Lev
9,243,391 B2 1/2016 Jonte et al.
9,254,499 B2 2/2016 Klicpera
9,266,127 B2 2/2016 Sato et al.
9,266,136 B2 2/2016 Klicpera
9,283,580 B2 3/2016 Isley
9,333,698 B2 5/2016 Devries et al.
9,346,071 B2 5/2016 Davenport
9,423,167 B2 8/2016 Bowen et al.
9,427,759 B2 8/2016 Chiu
9,427,760 B2 8/2016 Chiu
9,441,831 B2 9/2016 Fossen et al.
9,472,128 B2 10/2016 Rosenthal
9,486,817 B2 11/2016 Patton et al.
9,487,384 B1 11/2016 Denise
9,505,018 B2 11/2016 Vogtner et al.
9,552,706 B2 1/2017 Schneider et al.
9,584,892 B2 2/2017 Berkman et al.
9,621,462 B2 4/2017 Hui et al.
9,631,806 B2 4/2017 Mabry et al.
9,662,268 B2 5/2017 Eddington
9,693,140 B2 6/2017 Spector
9,702,132 B2 7/2017 Chimene
9,732,955 B2 8/2017 Hui et al.
9,757,741 B2 9/2017 Hawkins
9,777,468 B2 10/2017 Burgo et al.
9,797,567 B2 10/2017 Kastner-Jung et al.
9,855,568 B2 1/2018 Hawkins
9,872,095 B2 1/2018 Lee
9,914,146 B2 3/2018 Vogtner et al.
9,943,869 B2 4/2018 Huang et al.
10,003,873 B2 6/2018 Hanna et al.
10,010,223 B2 7/2018 Burgo et al.
10,023,456 B1 7/2018 Denise
10,035,547 B1 7/2018 Reyes
10,046,960 B1 8/2018 Denise
10,077,194 B2 9/2018 Knight et al.
10,077,571 B2 9/2018 Hsu et al.
10,107,539 B2 10/2018 Bowen et al.
10,113,739 B2 10/2018 Schneider, II
10,125,478 B2 11/2018 Loeck et al.
10,145,523 B2 12/2018 Hillyard et al.
10,157,552 B2 12/2018 Hu
10,171,900 B2 1/2019 Hanna et al.
10,184,233 B2 1/2019 Wu
10,221,583 B1 3/2019 Elder et al.
10,301,799 B2 5/2019 Thompson et al.
10,323,969 B2 6/2019 Geller et al.
10,329,749 B2 6/2019 Kacik et al.
10,329,751 B2 6/2019 Schneider
10,343,176 B2 7/2019 Hu et al.
10,349,787 B2 7/2019 Burgo et al.
10,358,801 B2 7/2019 Velapure et al.
10,358,802 B2 7/2019 Chiu
10,376,904 B2 8/2019 Jack
10,378,707 B2 8/2019 Hillyard et al.
10,393,363 B2 8/2019 Weaver et al.
10,399,094 B2 9/2019 Huffington et al.
10,434,524 B2 10/2019 Kajuch et al.
10,441,960 B2 10/2019 Rogers
10,456,793 B2 10/2019 Nikles
10,458,642 B2 10/2019 Heuer et al.
10,464,096 B2 11/2019 Ferguson et al.
10,478,376 B2 11/2019 Tran et al.
10,500,596 B2 12/2019 Lin et al.
10,562,044 B2 2/2020 Sunshine
10,568,466 B2 2/2020 Sunshine
10,584,844 B1 3/2020 Parrillo
10,591,138 B1 3/2020 Blackdiamond
10,597,858 B2 3/2020 Kang et al.
10,632,480 B2 4/2020 Yu
10,661,284 B2 5/2020 Lin et al.
10,675,644 B2 6/2020 Rexach et al.
10,682,655 B2 6/2020 Pitsch et al.
10,697,628 B2 6/2020 Rosko et al.
10,729,087 B2 8/2020 Spiro
10,745,893 B2 8/2020 Silverstein et al.

(56) References Cited

U.S. PATENT DOCUMENTS 10,887,125 B2 1/2021 Rexach et al.
10,895,065 B2 1/2021 Zhu et al.
10,913,084 B2 2/2021 Tang et al.
10,945,059 B2 3/2021 Hanna et al.
10,967,390 B2 4/2021 Lord et al.
11,033,912 B2 6/2021 Contu et al.
11,096,527 B2 8/2021 Bice
11,118,368 B2 9/2021 Carter
11,172,625 B2 11/2021 Spiro
11,178,475 B2 11/2021 Hanna
11,179,734 B2 11/2021 Shengiun et al.
11,184,967 B2 11/2021 Coleman
11,198,146 B2 12/2021 Huang
11,213,834 B2 1/2022 Quinn et al.
11,267,004 B2 3/2022 Rosko et al.
11,278,920 B2 3/2022 Hofman
11,311,893 B2 4/2022 Malert et al.
11,325,142 B2 5/2022 Moran et al.
11,338,306 B2 5/2022 Ning et al.
11,376,612 B2 7/2022 Fan
11,383,260 B2 7/2022 Berlovan et al.
11,499,300 B2 11/2022 Sierks et al.
11,504,723 B2 11/2022 Grigor et al.
11,541,404 B2 1/2023 Cipriani et al.
11,548,017 B2 1/2023 Rexach et al.
11,566,406 B2 1/2023 Chung
11,577,260 B2 2/2023 Soetaert et al.
11,602,032 B2 3/2023 Miller et al.
11,602,760 B2 3/2023 Malcolm
2001/0001329 A1 5/2001 Zankow
2002/0074420 A1 6/2002 Koren
2002/0130627 A1 9/2002 Morgan et al.
2002/0131265 A1 9/2002 Cilia
2002/0136024 A1 9/2002 Kuykendal et al.
2002/0139865 A1 10/2002 Mulvaney
2002/0153851 A1 10/2002 Morgan et al.
2002/0158153 A1 10/2002 Zieger et al.
2002/0163316 A1 11/2002 Lys et al.
2002/0171365 A1 11/2002 Morgan et al.
2002/0179728 A1 12/2002 Beidokhti
2003/0000010 A1 1/2003 Shimizu
2003/0009823 A1 1/2003 Ko
2003/0019028 A1 1/2003 Shimizu
2003/0084897 A1 5/2003 Coughlin
2003/0098361 A1 5/2003 Kuykendal et al.
2003/0147238 A1 8/2003 Allen et al.
2003/0189753 A1 10/2003 Lunde
2004/0032749 A1 2/2004 Schindler et al.
2004/0035951 A1 2/2004 Hsieh
2004/0129794 A1 7/2004 Deichmann et al.
2004/0160769 A1 8/2004 Currie et al.
2004/0179351 A1 9/2004 Patterson
2004/0212993 A1 10/2004 Morgan et al.
2004/0227034 A1 11/2004 Wentland et al.
2004/0251323 A1 12/2004 Clark
2004/0258567 A1 12/2004 Kokin et al.
2004/0262417 A1 12/2004 Proch
2005/0011966 A1 1/2005 Lin
2005/0036300 A1 2/2005 Dowling et al.
2005/0044617 A1 3/2005 Mueller et al.
2005/0047143 A1 3/2005 Currie
2005/0094398 A1 5/2005 Currie
2005/0121544 A1 6/2005 Pavlik
2005/0127199 A1 6/2005 Richmond
2005/0129546 A1 6/2005 Lin
2005/0133100 A1 6/2005 Bolderheij et al.
2005/0135099 A1 6/2005 Stuhlmacher
2005/0144715 A1 7/2005 Bassista
2005/0155144 A1 7/2005 McDonald et al.
2005/0157493 A1 7/2005 Clark
2005/0223490 A1 10/2005 Kunkel
2005/0237742 A1 10/2005 Wang
2005/0268393 A1 12/2005 Bergstrom
2005/0276035 A1 12/2005 Currie
2006/0002105 A1 1/2006 Hinojosa
2006/0002153 A1 1/2006 Currie et al.
2006/0076308 A1 4/2006 Lei
2006/0077652 A1 4/2006 Theus
2006/0101573 A1 5/2006 Hallam et al.
2006/0102757 A1 5/2006 Johnson
2006/0102758 A1 5/2006 Johnson
2006/0117476 A1 6/2006 Kunkel
2006/0118645 A1 6/2006 An
2006/0133065 A1 6/2006 Douglass
2006/0133114 A1 6/2006 Shen
2006/0144075 A1 7/2006 Bowen et al.
2006/0150316 A1 7/2006 Fukuizumi et al.
2006/0152917 A1 7/2006 Stuhlmacher et al.
2006/0163374 A1 7/2006 Wooten
2006/0175423 A1 8/2006 White et al.
2006/0175424 A1 8/2006 Tatum et al.
2006/0175437 A1 8/2006 Gross
2006/0201190 A1 9/2006 Bowen et al.
2006/0201191 A1 9/2006 Bowen et al.
2006/0201193 A1 9/2006 Bowen
2006/0201194 A1 9/2006 Bowen et al.
2006/0203470 A1 9/2006 Gautschi et al.
2006/0207015 A1 9/2006 DeBoer et al.
2006/0226250 A1 10/2006 Elliott et al.
2006/0226255 A1 10/2006 DeBoer et al.
2006/0237439 A1 10/2006 Norwood et al.
2006/0243819 A1 11/2006 Beidokhti
2006/0250784 A1 11/2006 Langone
2006/0262516 A9 11/2006 Dowling et al.
2007/0008713 A1 1/2007 Doyle
2007/0037470 A1 2/2007 Rothan
2007/0053174 A1 3/2007 Lin
2007/0067899 A1 3/2007 McDonald et al.
2007/0080244 A1 4/2007 McGarry et al.
2007/0084945 A1 4/2007 Wei
2007/0091585 A1 4/2007 Hedman
2007/0095933 A1 5/2007 Ehresman et al.
2007/0097665 A1 5/2007 Nanni et al.
2007/0139910 A1 6/2007 Gosis et al.
2007/0157978 A1 7/2007 Jonte et al.
2007/0200009 A1 8/2007 Mueller
2007/0204925 A1 9/2007 Bolderheij et al.
2007/0220670 A1 9/2007 Woehrle et al.
2007/0236913 A1 10/2007 Caillaba et al.
2007/0272770 A1 11/2007 Leber et al.
2008/0052820 A1 3/2008 Lu
2008/0094821 A1 4/2008 Vogtner
2008/0098512 A1 5/2008 Fang
2008/0099574 A1 5/2008 Lin
2008/0101054 A1 5/2008 Scali et al.
2008/0105805 A1 5/2008 Glunk
2008/0120772 A1 5/2008 Goehring et al.
2008/0121293 A1 5/2008 Leber et al.
2008/0130267 A1 6/2008 Dowling et al.
2008/0163641 A1 7/2008 Mitchell
2008/0164336 A1 7/2008 Kunkel
2008/0180939 A1 7/2008 Colin
2008/0202611 A1 8/2008 Keiper et al.
2008/0205034 A1 8/2008 Kunkel et al.
2008/0225517 A1 9/2008 Clark
2008/0232090 A1 9/2008 Hecht
2008/0247153 A1 10/2008 Groover
2008/0271238 A1 11/2008 Reeder et al.
2008/0271795 A1 11/2008 Buhlmann
2008/0289708 A1 11/2008 Schmidt et al.
2008/0291660 A1 11/2008 Gautschi et al.
2008/0315015 A1 12/2008 Hu
2009/0040762 A1 2/2009 Lu et al.
2009/0106891 A1 4/2009 Klicpera
2009/0133763 A1 5/2009 Yang
2009/0154524 A1 6/2009 Girelli
2009/0161342 A1 6/2009 Hou et al.
2009/0166378 A1 7/2009 Stilley
2009/0219708 A1 9/2009 Fuentes et al.
2009/0236444 A1 9/2009 Kunkel et al.
2009/0242659 A1 10/2009 Metlen et al.
2009/0250528 A1 10/2009 Schnuckle
2009/0272825 A1 11/2009 Johnson
2009/0273923 A1 11/2009 Veigel

(56) References Cited

U.S. PATENT DOCUMENTS

| | | | |
|---|---|---|---|
| 2009/0289577 | A1 | 11/2009 | Thursfield et al. |
| 2010/0002423 | A1 | 1/2010 | Liao |
| 2010/0012194 | A1 | 1/2010 | Jonte et al. |
| 2010/0012208 | A1 | 1/2010 | Chuang |
| 2010/0012751 | A1 | 1/2010 | Warren et al. |
| 2010/0043135 | A1 | 2/2010 | Patterson et al. |
| 2010/0046199 | A1 | 2/2010 | Carter |
| 2010/0071915 | A1 | 3/2010 | Caldani |
| 2010/0084492 | A1 | 4/2010 | Gautschi et al. |
| 2010/0085731 | A1 | 4/2010 | Chen |
| 2010/0093267 | A1 | 4/2010 | Hogh et al. |
| 2010/0096017 | A1 | 4/2010 | Jonte et al. |
| 2010/0103646 | A1 | 4/2010 | Coushaine et al. |
| 2010/0155498 | A1 | 6/2010 | Hagaman |
| 2010/0192865 | A1 | 8/2010 | Hawk |
| 2010/0212745 | A1 | 8/2010 | Macdonald |
| 2010/0213398 | A1 | 8/2010 | Brunner et al. |
| 2010/0276508 | A1 | 11/2010 | Davies |
| 2010/0294860 | A1 | 11/2010 | Hsieh |
| 2010/0320231 | A1 | 12/2010 | Martindale et al. |
| 2011/0031334 | A1 | 2/2011 | Merritt et al. |
| 2011/0042489 | A1 | 2/2011 | Johnson |
| 2011/0043113 | A1 | 2/2011 | Weng et al. |
| 2011/0068192 | A1 | 3/2011 | Klicpera |
| 2011/0073670 | A1 | 3/2011 | Johnson |
| 2011/0139282 | A1 | 6/2011 | Loeck et al. |
| 2011/0164400 | A1 | 7/2011 | Kownacki et al. |
| 2011/0210188 | A1 | 9/2011 | Yao et al. |
| 2011/0210268 | A1 | 9/2011 | Dornseifer |
| 2011/0216526 | A1 | 9/2011 | Li |
| 2011/0259454 | A1 | 10/2011 | Tsai |
| 2011/0267803 | A1 | 11/2011 | Farrer |
| 2011/0271706 | A1 | 11/2011 | Bowen et al. |
| 2012/0037235 | A1 | 2/2012 | Hagaman |
| 2012/0091923 | A1 | 4/2012 | Kastner-Jung et al. |
| 2012/0099297 | A1 | 4/2012 | Fuentes et al. |
| 2012/0104114 | A1 | 5/2012 | Zhou et al. |
| 2012/0120630 | A1 | 5/2012 | Liao et al. |
| 2012/0145807 | A1 | 6/2012 | Martinez |
| 2012/0160349 | A1 | 6/2012 | Jonte et al. |
| 2012/0162973 | A1 | 6/2012 | Carter |
| 2012/0170424 | A1 | 7/2012 | Zhou et al. |
| 2012/0188748 | A1 | 7/2012 | Hui et al. |
| 2012/0211618 | A1 | 8/2012 | Drury et al. |
| 2012/0227821 | A1 | 9/2012 | Stimpson |
| 2012/0234409 | A1 | 9/2012 | Klicpera |
| 2012/0272445 | A1 | 11/2012 | Healy et al. |
| 2013/0008976 | A1 | 1/2013 | Johnson |
| 2013/0062437 | A1 | 3/2013 | Hanna et al. |
| 2013/0097773 | A1 | 4/2013 | Pinkus et al. |
| 2013/0098478 | A1 | 4/2013 | Kling et al. |
| 2013/0098489 | A1 | 4/2013 | Meehan et al. |
| 2013/0139889 | A1 | 6/2013 | Gan |
| 2013/0155651 | A1 | 6/2013 | Carter |
| 2013/0182411 | A1 | 7/2013 | Cuppen et al. |
| 2013/0256433 | A1 | 10/2013 | Gunthorpe |
| 2013/0299608 | A1 | 11/2013 | Spangler et al. |
| 2013/0308315 | A1 | 11/2013 | Capitani et al. |
| 2014/0000733 | A1 | 1/2014 | Jonte et al. |
| 2014/0029293 | A1 | 1/2014 | Zhang et al. |
| 2014/0090603 | A1 | 4/2014 | Hawk |
| 2014/0104813 | A1 | 4/2014 | Donahue |
| 2014/0117107 | A1 | 5/2014 | Vogtner et al. |
| 2014/0118998 | A1 | 5/2014 | Mabry et al. |
| 2014/0126182 | A1 | 5/2014 | Doud |
| 2014/0131472 | A1 | 5/2014 | Eddington |
| 2014/0183279 | A1 | 7/2014 | Hanna et al. |
| 2014/0226309 | A1 | 8/2014 | Rosenthal |
| 2014/0261767 | A1 | 9/2014 | Devries et al. |
| 2014/0268650 | A1 | 9/2014 | Tsai |
| 2014/0299628 | A1 | 10/2014 | Gormley et al. |
| 2014/0340872 | A1 | 11/2014 | Campbell |
| 2014/0352347 | A1 | 12/2014 | Bowen et al. |
| 2015/0028130 | A1 | 1/2015 | Sato et al. |
| 2015/0033469 | A1 | 2/2015 | Ferrante |
| 2015/0034738 | A1 | 2/2015 | Xu et al. |
| 2015/0043195 | A1 | 2/2015 | Hui et al. |
| 2015/0053790 | A1 | 2/2015 | Hanna et al. |
| 2015/0089734 | A1 | 4/2015 | Berngard |
| 2015/0101121 | A1 | 4/2015 | Burgo Sr. et al. |
| 2015/0130924 | A1 | 5/2015 | Mabry et al. |
| 2015/0131262 | A1 | 5/2015 | Mabry et al. |
| 2015/0138754 | A1 | 5/2015 | Tsai |
| 2015/0202637 | A1 | 7/2015 | Nikles |
| 2015/0202642 | A1 | 7/2015 | Isley |
| 2015/0208152 | A1 | 7/2015 | Hanna et al. |
| 2015/0211728 | A1 | 7/2015 | Zhadanov et al. |
| 2015/0218784 | A1 | 8/2015 | Mazz et al. |
| 2015/0233100 | A1 | 8/2015 | Loeck et al. |
| 2015/0267883 | A1 | 9/2015 | Hillyard et al. |
| 2015/0271583 | A1 | 9/2015 | Wan |
| 2015/0354185 | A1 | 12/2015 | Tseng et al. |
| 2015/0354186 | A1 | 12/2015 | Tseng et al. |
| 2016/0024767 | A1 | 1/2016 | Hong et al. |
| 2016/0054007 | A1 | 2/2016 | Rieger et al. |
| 2016/0069052 | A1 | 3/2016 | Burgo et al. |
| 2016/0082485 | A1 | 3/2016 | Shiroko et al. |
| 2016/0121357 | A1 | 5/2016 | Fossen et al. |
| 2016/0138254 | A1 | 5/2016 | Chimene |
| 2016/0167069 | A1 | 6/2016 | Chiu |
| 2016/0167070 | A1 | 6/2016 | Chiu |
| 2016/0169502 | A1 | 6/2016 | Mabry et al. |
| 2016/0238213 | A1 | 8/2016 | Kimmet |
| 2016/0279648 | A1 | 9/2016 | Hawkins |
| 2016/0326732 | A1 | 11/2016 | Mccormick |
| 2016/0332894 | A1 | 11/2016 | Knight et al. |
| 2017/0010035 | A1 | 1/2017 | Bowen et al. |
| 2017/0065988 | A1 | 3/2017 | Huang |
| 2017/0072423 | A1 | 3/2017 | Vogtner et al. |
| 2017/0088410 | A1 | 3/2017 | Wing et al. |
| 2017/0138025 | A1 | 5/2017 | Burgo et al. |
| 2017/0152650 | A1 | 6/2017 | Hanna et al. |
| 2017/0218648 | A1 | 8/2017 | Hsu et al. |
| 2017/0225186 | A1 | 8/2017 | Ferguson et al. |
| 2018/0003354 | A1 | 1/2018 | Kastner-Jung et al. |
| 2018/0042812 | A1 | 2/2018 | Tran et al. |
| 2018/0058050 | A1 | 3/2018 | Wu |
| 2018/0103807 | A1 | 4/2018 | Burgo et al. |
| 2018/0128439 | A1 | 5/2018 | Bruls et al. |
| 2018/0135849 | A1 | 5/2018 | Paseta |
| 2018/0172264 | A1 | 6/2018 | Heuer et al. |
| 2018/0193852 | A1 | 7/2018 | L'Henaff et al. |
| 2018/0195711 | A1 | 7/2018 | Schneider, II |
| 2018/0251358 | A1 | 9/2018 | Wing et al. |
| 2018/0251359 | A1 | 9/2018 | Wing et al. |
| 2018/0251360 | A1 | 9/2018 | Wing et al. |
| 2018/0251361 | A1 | 9/2018 | Wing et al. |
| 2018/0288511 | A1 | 10/2018 | Hanna et al. |
| 2018/0306429 | A1 | 10/2018 | Rosko et al. |
| 2018/0306430 | A1 | 10/2018 | Weaver et al. |
| 2018/0320354 | A1 | 11/2018 | Kang et al. |
| 2019/0001006 | A1 | 1/2019 | Rodenbeck et al. |
| 2019/0003163 | A1 | 1/2019 | Loeck et al. |
| 2019/0032983 | A1 | 1/2019 | Bowen et al. |
| 2019/0056100 | A1 | 2/2019 | Schneider, II |
| 2019/0059659 | A1 | 2/2019 | Burgo et al. |
| 2019/0076855 | A1 | 3/2019 | Neumayr |
| 2019/0085540 | A1 | 3/2019 | Thadhani |
| 2019/0086042 | A1 | 3/2019 | Hillyard et al. |
| 2019/0141425 | A1 | 5/2019 | Hanna et al. |
| 2019/0146438 | A1 | 5/2019 | Rexach et al. |
| 2019/0220045 | A1 | 7/2019 | Huang et al. |
| 2019/0220046 | A1 | 7/2019 | Huang et al. |
| 2019/0264429 | A1 | 8/2019 | Sawaski |
| 2019/0293220 | A1 | 9/2019 | Tsai |
| 2019/0298111 | A1 | 10/2019 | Wu et al. |
| 2019/0309918 | A1 | 10/2019 | Hillyard et al. |
| 2019/0353317 | A1 | 11/2019 | Chang |
| 2019/0365161 | A1 | 12/2019 | Burgo et al. |
| 2020/0086336 | A1 | 3/2020 | Rosko et al. |
| 2020/0087900 | A1 | 3/2020 | Heitmann et al. |
| 2020/0129995 | A1 | 4/2020 | Zhadanov |
| 2020/0181894 | A1 | 6/2020 | Chung |
| 2020/0263400 | A1 | 8/2020 | Song et al. |

(56) References Cited

U.S. PATENT DOCUMENTS

| | | | |
|---|---|---|---|
| 2020/0346228 | A1 | 11/2020 | Cipriani |
| 2020/0346229 | A1 | 11/2020 | Wales et al. |
| 2021/0016301 | A1 | 1/2021 | Cipriani et al. |
| 2021/0095844 | A1 | 4/2021 | Heib et al. |
| 2021/0148101 | A1 | 5/2021 | Lev |
| 2021/0195712 | A1 | 6/2021 | Miller et al. |
| 2021/0211792 | A1 | 7/2021 | Liu et al. |
| 2021/0229114 | A1 | 7/2021 | Trefren |
| 2021/0308698 | A1 | 10/2021 | Kajuch et al. |
| 2021/0353111 | A1 | 11/2021 | Hofman |
| 2021/0388584 | A1 | 12/2021 | Thomas et al. |
| 2022/0136223 | A1 | 5/2022 | Boyer |
| 2022/0167801 | A1 | 6/2022 | Gospel et al. |
| 2022/0184643 | A1 | 6/2022 | Zhadanov |
| 2022/0193700 | A1 | 6/2022 | Lev |
| 2022/0248917 | A1 | 8/2022 | Duckery |
| 2022/0250098 | A1 | 8/2022 | Leonhard et al. |
| 2022/0266287 | A1 | 8/2022 | Shade |
| 2022/0298766 | A1 | 9/2022 | Hofman |
| 2022/0341135 | A1 | 10/2022 | Hofman |
| 2022/0364342 | A1 | 11/2022 | Shade et al. |
| 2023/0003007 | A1 | 1/2023 | Bourne et al. |
| 2023/0079771 | A1 | 3/2023 | Spangler et al. |
| 2023/0083326 | A1 | 3/2023 | Zhadanov |

FOREIGN PATENT DOCUMENTS

| | | | | |
|---|---|---|---|---|
| CN | 201067361 | Y | 6/2008 | |
| CN | 201116630 | Y | 9/2008 | |
| CN | 201248646 | Y | 6/2009 | |
| CN | 101476634 | A | 7/2009 | |
| CN | 201350424 | Y | 11/2009 | |
| CN | 201353537 | | 12/2009 | |
| CN | 201354883 | Y | 12/2009 | |
| CN | 201407414 | Y | 2/2010 | |
| CN | 101669782 | A | 3/2010 | |
| CN | 201954100 | U | 8/2011 | |
| CN | 203862431 | U | 10/2012 | |
| CN | 203757174 | U | 8/2014 | |
| CN | 203809853 | U | 9/2014 | |
| CN | 105318099 | A | 2/2016 | |
| CN | 105508659 | A | 4/2016 | |
| CN | 105526381 | A | 4/2016 | |
| CN | 105750102 | | 7/2016 | |
| CN | 205534547 | U | 8/2016 | |
| CN | 206112251 | U | 4/2017 | |
| CN | 106667326 | A | 5/2017 | |
| CN | 209565113 | U | 11/2019 | |
| CN | 211022372 | U | 7/2020 | |
| DE | 10004981 | A1 | 6/2003 | |
| DE | 20304520.8 | | 7/2003 | |
| DE | 20 2004 016 297 | U1 | 5/2005 | |
| DE | 10 2004 001 256 | A1 | 8/2005 | |
| DE | 10 2006 020 766 | A1 | 11/2007 | |
| DE | 20 2014 002 728 | U1 | 5/2014 | |
| EP | 1440649 | A2 * | 7/2004 | ............... A47K 3/30 |
| EP | 1 531 204 | A1 | 5/2005 | |
| EP | 1 829 581 | A1 | 9/2007 | |
| EP | 2 085 143 | A1 | 8/2009 | |
| EP | 2 218 512 | A1 | 8/2010 | |
| EP | 2 896 757 | A2 | 7/2015 | |
| EP | 3 088 613 | A1 | 11/2016 | |
| EP | 3 375 338 | A1 | 9/2018 | |
| FR | 1346555 | | 12/1962 | |
| GB | 0 360 676 | | 11/1931 | |
| GB | 0 516 982 | | 1/1940 | |
| GB | 0 526 170 | | 9/1940 | |
| JP | 19-79159075 | A | 12/1979 | |
| JP | 19-85184782 | A | 9/1985 | |
| JP | 19-90307553 | A | 12/1990 | |
| JP | 19-91176519 | A | 7/1991 | |
| JP | 19-91265769 | A | 11/1991 | |
| JP | 19-92079920 | A | 3/1992 | |
| JP | 19-92112692 | U | 9/1992 | |
| JP | 19-92112693 | U | 9/1992 | |
| JP | 19-93202540 | A | 8/1993 | |
| JP | 19-94002348 | A | 1/1994 | |
| JP | 19-94146356 | A | 5/1994 | |
| JP | 19-95189510 | A | 7/1995 | |
| JP | 19-96243453 | A | 9/1996 | |
| JP | H09-173238 | A | 7/1997 | |
| JP | 19-98252111 | A | 9/1998 | |
| JP | 19-99238404 | A | 8/1999 | |
| JP | 2000-170226 | A | 6/2000 | |
| JP | 2000-336709 | A | 12/2000 | |
| JP | 2000-336710 | A | 12/2000 | |
| JP | 2001-107407 | A | 4/2001 | |
| JP | 2003-010274 | A | 1/2003 | |
| JP | 2003-232059 | A | 8/2003 | |
| JP | 2003-293406 | A | 10/2003 | |
| JP | 2004-211339 | A | 7/2004 | |
| JP | 2004-239615 | A | 8/2004 | |
| JP | 2005-127232 | A | 5/2005 | |
| JP | 2006-112611 | A | 4/2006 | |
| JP | 2007-291606 | A | 11/2007 | |
| JP | 2007-308877 | A | 11/2007 | |
| JP | 2009-539463 | A | 11/2009 | |
| JP | 2009-299339 | A | 12/2009 | |
| JP | 2010-007263 | A | 1/2010 | |
| JP | 4665207 | B2 | 4/2011 | |
| JP | 2012-132171 | A | 7/2012 | |
| JP | 5212896 | B2 | 6/2013 | |
| JP | 5234496 | B2 | 7/2013 | |
| JP | 5384069 | B2 | 1/2014 | |
| JP | 2017-140069 | A | 8/2017 | |
| KR | 1019910700387 | A | 3/1991 | |
| KR | 1019970002061 | A | 1/1997 | |
| KR | 1020030013498 | A | 2/2003 | |
| KR | 200329636 | Y1 | 10/2003 | |
| KR | 100493202 | B1 | 6/2005 | |
| KR | 100510593 | B1 | 8/2005 | |
| KR | 100565772 | B1 | 3/2006 | |
| KR | 2020060000191 | U | 12/2006 | |
| KR | 100796448 | B1 | 1/2008 | |
| KR | 100840867 | B1 | 6/2008 | |
| KR | 20090005671 | U | 6/2009 | |
| KR | 2020100001167 | U | 2/2010 | |
| KR | 101056124 | B1 | 8/2011 | |
| KR | 101132715 | B1 | 4/2012 | |
| KR | 101512343 | B1 | 4/2015 | |
| KR | 20170114473 | | 10/2017 | |
| KR | 20190059748 | A | 5/2019 | |
| TW | M290956 | U | 5/2006 | |
| TW | M353280 | | 3/2009 | |
| WO | WO-85/05167 | A1 | 11/1985 | |
| WO | WO-87/05811 | | 10/1987 | |
| WO | WO-91/05114 | | 4/1991 | |
| WO | WO-91/05204 | | 4/1991 | |
| WO | WO-91/12896 | A1 | 9/1991 | |
| WO | WO-95/29300 | A1 | 11/1995 | |
| WO | WO-98/28496 | | 7/1998 | |
| WO | WO-99/23413 | A1 | 5/1999 | |
| WO | WO-01/22096 | | 3/2001 | |
| WO | WO-01/34917 | A1 | 5/2001 | |
| WO | WO-01/40704 | | 6/2001 | |
| WO | WO-02/087781 | | 11/2002 | |
| WO | WO-02/091894 | A1 | 11/2002 | |
| WO | WO-03/106772 | A1 | 12/2003 | |
| WO | WO-2004/001142 | | 12/2003 | |
| WO | WO-2004/018935 | A1 | 3/2004 | |
| WO | WO-2004/051010 | | 6/2004 | |
| WO | WO-2004/052155 | | 6/2004 | |
| WO | WO-2004/058626 | | 7/2004 | |
| WO | WO-2004/060570 | | 7/2004 | |
| WO | WO-2004/071935 | | 8/2004 | |
| WO | WO-2004/076279 | | 9/2004 | |
| WO | WO-2004/082846 | | 9/2004 | |
| WO | WO-2004/092626 | | 10/2004 | |
| WO | WO-2005/036053 | A1 | 4/2005 | |
| WO | WO-2005/064231 | | 7/2005 | |
| WO | WO-2005/074431 | | 8/2005 | |
| WO | WO-2005/100852 | | 10/2005 | |
| WO | WO-2005/118967 | | 12/2005 | |
| WO | WO-2005/120321 | | 12/2005 | |

(56) References Cited

FOREIGN PATENT DOCUMENTS

| | | | |
|---|---|---|---|
| WO | WO-2006/055628 | | 5/2006 |
| WO | WO-2006/055759 | | 5/2006 |
| WO | WO-2006/072397 | | 7/2006 |
| WO | WO-2006/072398 | A1 | 7/2006 |
| WO | WO-2006/072399 | A1 | 7/2006 |
| WO | WO-2006/094684 | | 9/2006 |
| WO | WO-2007/051367 | A1 | 5/2007 |
| WO | WO-2007/070581 | | 6/2007 |
| WO | WO-2007/079799 | | 7/2007 |
| WO | WO-2007/090012 | | 8/2007 |
| WO | WO-2007/128447 | | 11/2007 |
| WO | WO-2007/128448 | A1 | 11/2007 |
| WO | WO-2007/128500 | A1 | 11/2007 |
| WO | WO-2007/129174 | | 11/2007 |
| WO | WO-2007/141766 | | 12/2007 |
| WO | WO-2007/147481 | | 12/2007 |
| WO | WO-2008/061928 | A1 | 5/2008 |
| WO | WO-2008/088534 | | 7/2008 |
| WO | WO-2008/089600 | A1 | 7/2008 |
| WO | WO-2008/107052 | A1 | 9/2008 |
| WO | WO-2008/144955 | A1 | 12/2008 |
| WO | WO-2009/000109 | A1 | 12/2008 |
| WO | WO-2009/027779 | A2 | 3/2009 |
| WO | WO-2009/121072 | | 10/2009 |
| WO | WO-2008/038315 | A1 | 1/2010 |
| WO | WO-2010/028779 | | 3/2010 |
| WO | WO-2010/066245 | | 6/2010 |
| WO | WO-2010/081353 | | 7/2010 |
| WO | WO-2010/081354 | | 7/2010 |
| WO | WO-2010/127491 | | 11/2010 |
| WO | WO-2010/135869 | | 12/2010 |
| WO | WO-2011/009383 | A1 | 1/2011 |
| WO | WO-2011/009384 | A1 | 1/2011 |
| WO | WO-2011/075321 | A1 | 6/2011 |
| WO | WO-2011/148399 | A1 | 12/2011 |
| WO | WO-2012/038875 | | 3/2012 |
| WO | WO-2013/036631 | | 3/2013 |
| WO | WO-2013/084228 | | 6/2013 |
| WO | WO-2013/140228 | | 9/2013 |
| WO | WO-2014/048399 | A1 | 4/2014 |
| WO | WO-2014/048884 | A1 | 4/2014 |
| WO | WO-2014/070491 | | 5/2014 |
| WO | WO-2014/071422 | | 5/2014 |
| WO | WO-2014/149317 | | 9/2014 |
| WO | WO-2014/166613 | | 10/2014 |
| WO | WO-2015/057564 | | 4/2015 |
| WO | WO-2016/142801 | A1 | 9/2016 |
| WO | WO-2016/164747 | | 10/2016 |
| WO | WO-2017/006168 | | 1/2017 |
| WO | WO-2014/188880 | | 2/2017 |
| WO | WO-2017/059027 | | 4/2017 |
| WO | WO-2017/078298 | | 5/2017 |
| WO | WO-2017/112795 | | 6/2017 |
| WO | WO-2017/207560 | | 12/2017 |
| WO | WO-2008/006248 | A1 | 1/2018 |
| WO | WO-2018/112222 | | 6/2018 |
| WO | WO-2019/079393 | A1 | 4/2019 |
| WO | WO-2019/197662 | A1 | 10/2019 |
| WO | WO-2020/045855 | A1 | 3/2020 |
| WO | WO-02/1146642 | A1 | 7/2021 |

OTHER PUBLICATIONS

First Chinese Office Action on CN Appl. Ser. No. 202011516410.3 dated Mar. 25, 2022 (24 pages).

Non-Final Office Action on U.S. Appl. No. 17/121,057 dated May 23, 2022.

Notice of Allowance on U.S. Appl. No. 17/121,057 dated Nov. 9, 2022.

Amazon.com, “Dream Spa All Chrome 3-way LED Shower Head Combo with Air Jet LED Turbo Pressure-Boost Nozzle Technology. Color of LED lights changes automatically according to water temperature,” Internet URL: https://www.amazon.com/dp/B00QKPOAMS ?_ encoding=UTF8&psc=1&ref _= cm_sw_r_cp_ud_dp_JO YH99ZDPWCW1YNBVEPP, date first available Jan. 1, 2015.

amazon.com, “DreamSpa All Chrome Water Temperature Controlled Color Changing 5-Setting LED Shower Head by Top Brand Manufacturer! Color of LED lights changes automatically according to water temperature”, Internet URL: https://www.amazon.com/dp/B00JV4BVCM?ref_=cm_sw_r_cp_ud_dp_8TT83SMQHADRH7XQXJ5Z, date first available Jun. 6, 2014.

amazon.com, “Gangang Long Neck LED Touchless Bathroom Faucet Kitchen Automatic Sensor Tap with Water Mixer Valve and Control Box(LED Goose Neck)”, Internet URL: https://www.amazon.com/Gangang-Touchless-Kitchen-Faucet-Automatic/dp/B07477N317?th=1, date first available Jul. 24, 2017.

amazon.com, “Sprinkle Wall Mount Color Changing Led Waterfall Bathroom Sink Faucet Single Handle Widespread Water Flow Powered Lavatory Bath Shower Mixer Taps Vessel Sink Faucets Plumbing Fixtures with Hole Cover Plate”, Internet URL: https://www.amazon.com/dp/B007WR5MSO/?tag=097-20&ascsubtag=default, date first available Apr. 23, 2012.

amazon.com, “Sumerain S6026CL Single Handle Deck Mount LED Kitchen Faucet with Pull-Out Sprayer, Chrome”, Internet URL: https://www.amazon.com/Sumerain-S6026CL-Kitchen-Pull-Out-Sprayer/dp/B0090Q8QU6?source=ps-sl-shoppingads-Ipcontext&ref _=fplfs&psc=1&smid=ATVPDKIKXODER, date first available Mar. 29, 2012.

amazon.com, “Temperature Controlled Faucet Light (Chrome)”, Internet URL: https://www.amazon.com/dp/B0015PWOK8/?tag=097-20&ascsubtag=default, date first available Nov. 18, 2005.

Foreign Search Report on PCT dated Sep. 19, 2023.

Dornbracht.com, “Aquahalo—Follow Your Bliss”, retrieved from URL https://media.cdn.dornbracht.com/v/dCEWdtlk/AQUAHALO-GB-IT-ES_web.pdf on Apr. 15, 2024.

* cited by examiner

SYSTEMS AND METHODS FOR LIGHTED SHOWERING

CROSS-REFERENCE TO RELATED PATENT APPLICATIONS

This application is a Continuation of U.S. patent application Ser. No. 17/121,057, filed Dec. 14, 2020, which claims the benefit of and priority to U.S. Provisional Application No. 62/951,974, filed Dec. 20, 2019 The entire disclosures of each of the aforementioned applications are hereby incorporated by reference herein.

BACKGROUND

The present disclosure relates generally to showerheads. More specifically, the present disclosure relates to showerheads that include features for providing ambient lighting in showers and/or for providing information or indications relating to the showering experience such as the duration of the shower, the temperature of the water in the shower, and/or other information that a user may find useful.

Many residential spaces (e.g., homes, condos, apartments, hotels, motels, etc.) have showers. Often times, showers may be located in a space that is not well lit. For instance, where a home has a shower having a shower curtain, the shower may not be lit with ambient lighting or with a lighting fixture positioned within the showering enclosure for providing additional light for a user. When constructing a bathroom, some homeowners may install lighting within the shower space, such recessed lighting, for instance. However, installing lighting in the shower space after a bathroom has already been constructed can be difficult and costly.

Conventional showering environments also do not typically include information about the showering experience. For example, it may be useful for a user of the shower to know the duration of the shower, whether the water has reached a desired temperature, and so forth.

It would be advantageous to provide a showerhead that addresses one or more of the aforementioned issues.

SUMMARY

At least one embodiment relates to a showerhead. The showerhead includes a plurality of water outlets for providing a flow of water. The showerhead includes a plurality of lighting elements. The showerhead includes a light driver communicably coupled to the plurality of lighting elements. The light driver is configured to control at least a subset of the plurality of lighting elements in response to a temperature and a duration of the flow of water, so as to provide a visual indication as to the temperature and the duration of the flow of water.

In some embodiments, the showerhead further includes a temperature sensor communicably coupled to the light driver. The temperature sensor may be configured to sense a temperature of the water flow. The light driver may cause a subset of the lighting elements to output light having a color scheme that relates to the temperature. In some embodiments, the showerhead further includes a clock for determining the duration of the flow of water. In some embodiments, the light driver increases a number of the plurality of lighting elements which output light as the duration increases. In some embodiments, the light driver sequentially activates a subset of the plurality of lighting elements in a clockwise fashion as the duration increases. In some embodiments, the light driver is configured to control each of the plurality of lighting elements to output light when the duration meets a threshold duration. In some embodiments, the light driver increases an intensity of light output from the plurality of lighting elements as the duration increases. In some embodiments, the showerhead further includes a hydrogenerator configured to generate power for the plurality of lighting elements and the light driver using water flowing from a water source to the plurality of water outlets. In some embodiments, the plurality of lighting elements are arranged along a perimeter portion of the showerhead. The plurality of water outlets may be arranged in an interior portion of the showerhead surrounded by the perimeter portion.

At least one embodiment relates to a showerhead. The showerhead includes a housing defining an inner cavity and an inlet. The showerhead includes a shower face having a plurality of water outlets. The plurality of water outlets may be fluidly coupled to the inlet of the housing. The showerhead includes a light reflector arranged along the inner cavity. The showerhead includes one or more lighting elements arranged to direct light towards the light reflector. Light from the lighting elements is directed parallel to and opposite a direction of water flow from the inlet through the showerhead. The showerhead includes a light diffuser at least partially surrounding the shower face. The light diffuser receives light reflected from the light reflector and diffusing light outwardly from the light diffuser.

In some embodiments, the housing defines an axis extending through the inlet. Water may flow into the housing through the inlet in a first direction. Light from the one or more lighting elements may be emitted in a second direction which is at least partially parallel to the axis, where the second direction is opposite the first direction. In some embodiments, the housing further includes a hydro-generator fluidically coupled to the inlet and arranged between the inlet and the water outlets of the shower face. The hydrogenerator may provide power to the one or more lighting elements. In some embodiments, the showerhead further includes a light driver communicably coupled to the one or more lighting elements. The light driver may be configured to determine a temperature of the flow of water. The light driver may be configured to determine a duration of the flow of water. The light driver may be configured to control at least a subset of the one or more lighting elements to provide an indication as to the temperature and duration of the flow of water. In some embodiments, the showerhead further includes a temperature sensor communicably coupled to the light driver. The temperature sensor may be configured to sense a temperature of the water output from the plurality of water outlets. The light driver may cause the lighting elements to output light having a color scheme corresponding to the temperature. In some embodiments, the light driver increases a number of the lighting elements which output light as the duration increases. In some embodiments, the light driver sequentially activates a subset of the one or more lighting elements in a clockwise fashion as the duration increases. In some embodiments, the light driver is configured to control each of the one or more lighting elements to output light when the duration meets a threshold duration. In some embodiments, the light driver increases an intensity of the light output from the one or more lighting elements as the duration increases.

At least one embodiment relates to a showerhead. The showerhead includes a housing defining an inner cavity and an inlet. The showerhead includes a shower face having a plurality of water outlets. The plurality of water outlets are fluidly coupled to the inlet of the housing. The showerhead includes a light reflector arranged along the inner cavity. The showerhead includes one or more lighting elements arranged to direct light towards the light reflector. Light from the one or more lighting elements is directed parallel to and opposite a direction of water flow through the showerhead. The showerhead includes a light diffuser at least partially surrounding the shower face. The light diffuser receives light reflected from the light reflector and diffusing light outwardly from the light diffuser. The showerhead includes a light driver communicably coupled to the one or more lighting elements. The light driver is configured to determine a condition of water flow through the showerhead. The light driver is configured to generate a control signal for at least some of the one or more lighting elements to cause the lighting elements to output light having a state corresponding to the determined condition.

In some embodiments, the housing defines an axis extending through the inlet. Water may flow into the housing through the inlet in a first direction. Light from the lighting elements may be emitted in a second direction which is at least partially parallel to the axis. The second direction may be opposite the first direction.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
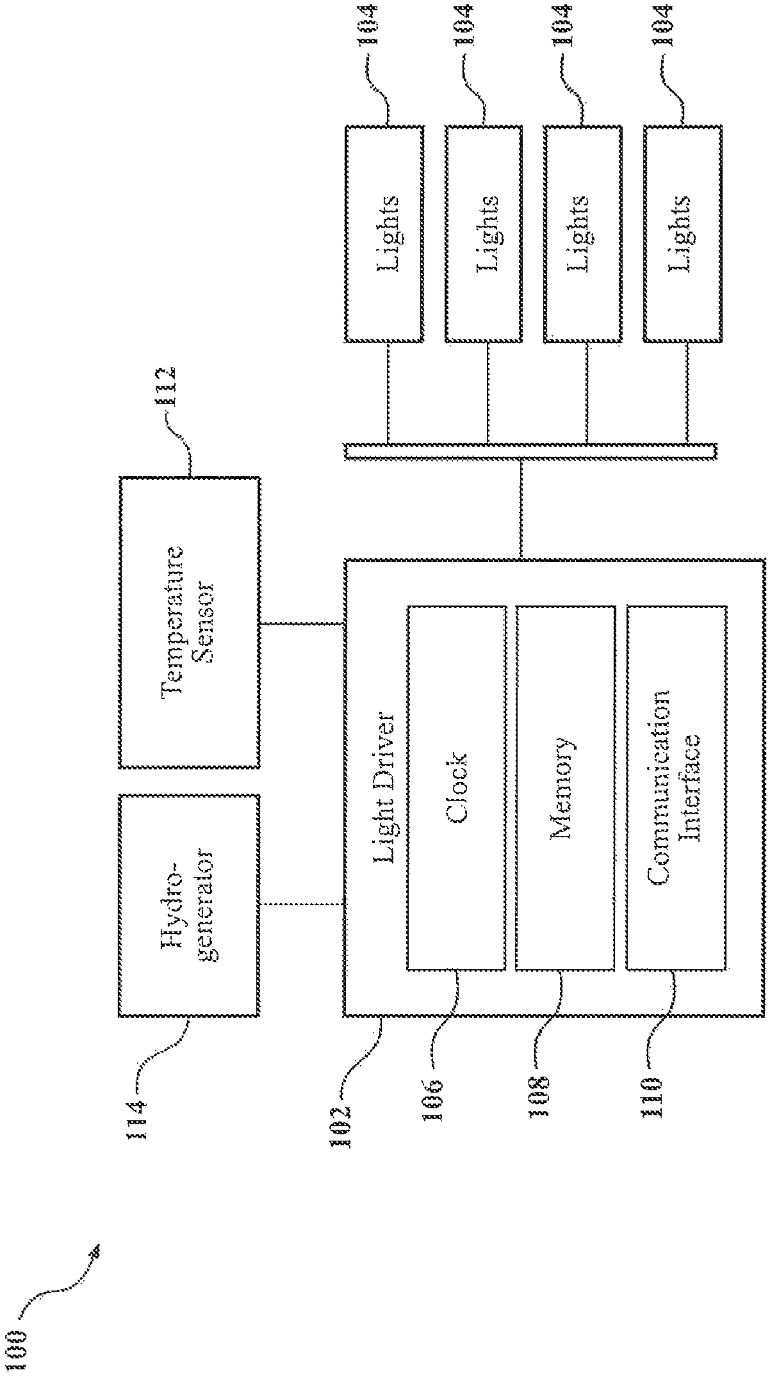
FIG. 1 shows a schematic diagram of a showerhead, according to an illustrative embodiment.

Referring generally to the FIGURES, a showerhead may include water outlets configured to output water from a water source. The showerhead may include a plurality of lights configured to provide ambient light to a showering environment (e.g., a shower enclosure, a bathtub, etc.). The showerhead may include a light driver communicably coupled to the plurality of lights. The light driver may be configured to determine a first condition and a second condition corresponding to the showerhead (such as a temperature of the water, a duration in which water is output from the water outlets, a time of day in which the shower is turned on, etc.). The light driver may be configured to generate a control signal for at least some of the plurality of lights which cause the lights to output light having a state corresponding to the first condition and the second condition. For instance, the light driver may generate a control signal for a selected number of the lights to output light (with the number of lights being selected by the light driver based on the duration in which water is output from the water outlets). As another example, the light driver may generate a control signal for at least some of the lights to output light having a color corresponding to the temperature of the water output from the plurality of outlets.

In many instances, showering environments may include insufficient ambient light. For instance, where a shower does not include any ambient lighting within a shower space or a lighting fixture within the showering environment, the shower space itself may be dark or dimly lit. Such conditions may not be preferable to users. The systems and methods described herein provide ambient lighting conditions in a shower space by integrating lights into a showerhead. Additionally, a user may perform tasks to get ready for their day or get ready for bed while their shower is running and the water is heating up. For instance, a user may turn on their shower and proceed with brushing their teeth, picking out clothes, etc. These tasks may take more time than is needed for the water to heat up. As such, water may be unnecessarily wasted due to the user not being aware of the shower being "ready" for use. Typically, for a user to determine whether the shower water temperature is sufficiently heated, a user will position their hand or arm beneath the shower to test the water temperature. This may be performed several times as the water heats up. The systems and methods described herein control the lights which provide ambient lighting conditions in the shower space to provide information about the shower to a user. For instance, the systems and methods described herein may control the lights to output light having a color scheme corresponding to the water temperature. Accordingly, a user may determine the water temperature by observing the color scheme of the lights of the showerhead, thus potentially eliminating the need to manually test the water temperature and wasted water. Some users may take longer showers than other users, resulting in wasted water. The systems and methods described herein may use the lights which provide ambient lighting conditions in the shower space to provide information corresponding to the duration of the shower, thus potentially conserving water. Various other benefits of the systems and methods are described in further detail below.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 2:
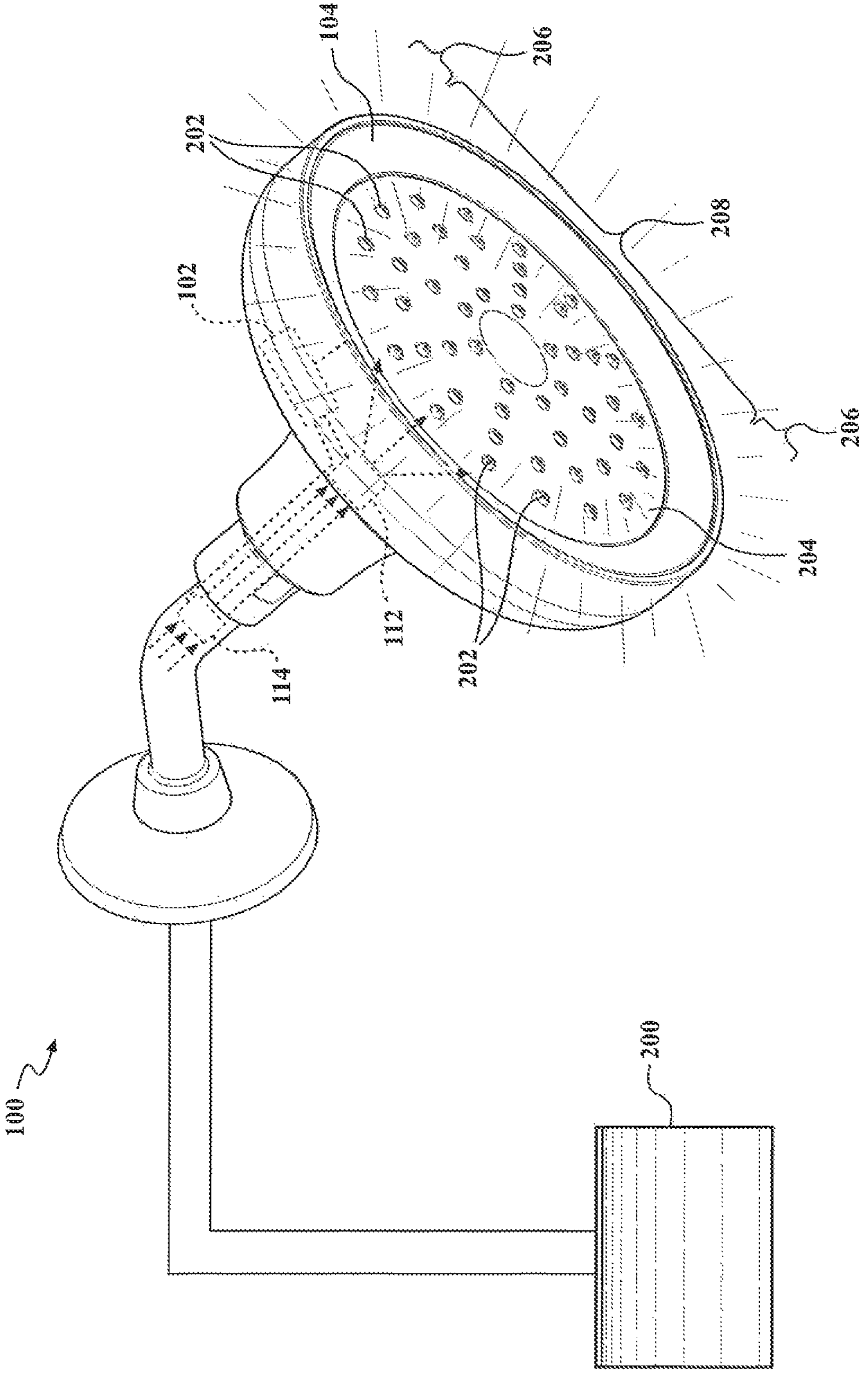
FIG. 2 shows a perspective view of the showerhead of FIG. 1, according to an illustrative embodiment.

Referring to FIG. 1 and FIG. 2, depicted is a schematic view and a perspective view of a showerhead 100, respectively, according to illustrative embodiments. The showerhead 100 may be installed in a shower space within a bathroom. The showerhead 100 may be coupled to a water source 200 such that water from the water source 200 selectively flows through the showerhead 100, out of a plurality of water outlets 202, and into the shower space. As shown in FIG. 1, the showerhead 100 may include a light driver 102 communicably coupled to a plurality of lights 104. In some embodiments, the showerhead 100 may include a diffusion ring 203 along a shower face 204 of the showerhead 100. The lights 104 may be located within the showerhead 100 behind the diffusion ring 203. In operation, the diffusion ring 203 may diffuse light from the lights 104 such that a user may not be able to see individual lights 104. Rather, the diffusion ring 203 may diffuse light from the lights 104 so as to give the effect of "contiguous" light along at least a portion of the diffusion ring 203.

The light driver 102 may include a clock 106, memory 108, and a communications interface 110. The showerhead 100 may include a temperature sensor 112 configured to sense a temperature of water flowing from the water source 200 through the showerhead 100 and out of the water outlets 202. As described in greater detail below, the light driver 102 may be configured to determine various conditions of water output from the water outlets 202, and control the lights 104 to output light having a state corresponding to the determined conditions.

The showerhead 100 may include a power source. In some embodiments, the power source may be internal to the showerhead 100. For instance, the power source may be a hydro-generator 114 (e.g., a micro hydro-generator). The hydro-generator 114 may be installed in-line between the water source 200 and the water outlets 202 of the showerhead 100. The hydro-generator 114 may be configured to generate power as water flowing from the water source 200 turns a turbine within the hydro-generator 114. The hydro-generator 114 may be configured to generate power to charge an internal battery (and/or capacitor) of the showerhead 100, which in turn powers various electrical components of the showerhead 100 (e.g., the light driver 102, the lights 104, the temperature sensor 112, etc.). In embodiments in which the hydro-generator 114 generates power to charge (at least) a capacitor, the capacitor may act as a "temporary battery" by discharging during instances of intermittent power generation via the hydro-generator 114 to stabilize brightness or consistency of the lights 104. While described as a hydro-generator 114, it is noted that the showerhead 100 may include various other types or forms of power sources internal to the showerhead 100 (e.g., one or more batteries such as lithium-ion batteries, etc.) which may be removable from the showerhead 100 for charging and/or replacing. Additionally, the showerhead 100 may be powered by various external power sources.

The showerhead 100 may include a light driver 102. While shown as embodied within the showerhead 100, in some implementations, the light driver 102 may be external to the showerhead 100. The light driver 102 may be communicably coupled to the lights 104 of the showerhead 100. The light driver 102 may include one or more processor(s), memory, and/or other circuits designed or implemented to generate control signals for lights 104 of the showerhead 100. The light driver 102 may be configured to generate control signals to turn on and off various lights 104, dim various lights 104, change a color or warmth of light output from the lights 104, and so forth. The light driver 102 may be configured to generate control signals based on determined conditions of water output from the water outlets 202 of the showerhead 100, as described in greater detail below.

Figure 3:
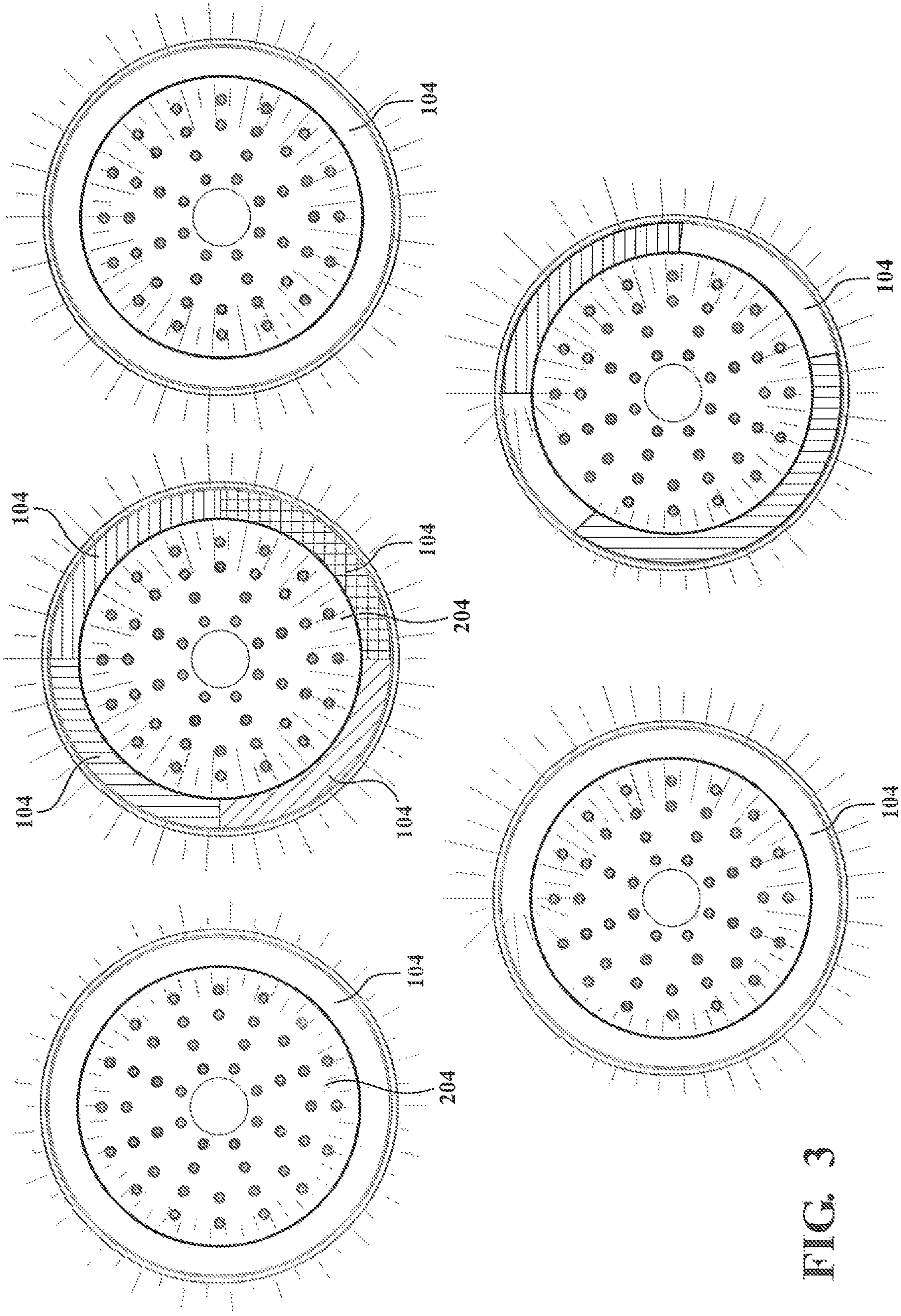
FIG. 3 shows several front views of a shower face of the showerhead of FIG. 1 with lights 104 having different states, according to an illustrative embodiment.

Referring to FIGS. 1-3, the showerhead 100 may include a plurality of lights 104. The lights 104 may be light emitting diodes (LEDs), organic LEDs, plasma display panel (PDP), liquid crystal display LCD), or other types or forms of lights. The lights 104 may be configured to output light by receiving a control signal from the light driver 102. As shown in FIG. 3, and in some embodiments, the lights 104 may be configured to have various states. Specifically, FIG. 3 depicts several front views of a shower face 204 of the showerhead 100 with the lights 104 behind the diffusion ring 203 having different states. The states may be, for instance, an on state (e.g., where the lights 104 output light), an off state (e.g., where the lights 104 do not output light), a dim state (e.g., where the lights 104 output light having a luminescence or brightness less than the on state), various colored states, and so forth. As shown in FIG. 3, the lights 104 may be configured to output light having a selectable color within the visible color spectrum. In some embodiments, the showerhead 100 may include several zones of lights (e.g., within the diffusion ring 203). Each zone may be dedicated to a particular color (e.g., with four zones shown in FIG. 3 corresponding to four different colors). The showerhead 100 may include any number of zones. In some embodiments, the lights 104 may be configured to output light in the warm light spectrum (e.g., between 2000 kelvin (K) and 3000 K), in the cool light spectrum (e.g., between 3100 K and 4500 K), in the daylight spectrum (e.g., between 4600 K and 6500 K), and/or various other color temperatures (e.g., between 1000 K and 2000 K, between 6500 K and 10,000 K, etc.). The lights 104 may be configured to convey various information as well as providing ambient lighting conditions within the shower space, as described in greater detail below.

In some embodiments, the lights 104 and the water outlets 202 may be arranged along a shower face 204 of the showerhead 100. In some embodiments, and as shown in FIG. 2 and FIG. 3, the lights 104 may be arranged along a perimeter portion 206 of the shower face 204. The perimeter portion 206 may span a space between an edge of the shower face 204 and an interior ring of the shower face 204. The water outlets 202 may be arranged within an interior portion 208 of the shower face 204 which is surrounded by the perimeter portion 206 (e.g., the interior portion 208 may be defined by the interior ring of the shower face 204). Hence, the shower face 204 may include separate portions for lights 104 and for water outlets 202. In some embodiments, and as shown in the various arrangements depicted in FIG. 4-FIG. 11 and described in greater detail below, the lights 104 and the water outlets 202 may be both span the shower face 204. For instance, the lights 104 may be arranged at or near the same location as the water outlets 202 of the shower face 204. The lights 104 may be configured to provide a backlight effect to the water outlets 202. While these two examples are provided, various other arrangements of the lights 104 and water outlets 202 may be provided on the shower face 204 of the showerhead 100.

The showerhead 100 may include a temperature sensor 112. The temperature sensor 112 may be configured to sense a temperature of water flowing from the water source 200, through the showerhead 100, and out of the water outlets 202 into the shower space. In some embodiments, the temperature sensor 112 may be configured to generate a voltage which changes in proportion to the water temperature. The temperature sensor 112 may be communicably coupled to the light driver 102. The temperature sensor 112 may be configured to transmit a signal corresponding to the water temperature to the light driver 102 for controlling the state of various lights 104 of the showerhead 100.

The light driver 102 may be configured to determine various conditions corresponding to the showerhead 100. The conditions may be or include water temperature, shower duration, a time of day in which the shower is turned on, etc. The light driver 102 may be configured to use the condition (s) corresponding to the showerhead 100 for generating control signals to control light output from the lights 104.

According to the embodiments described herein, the light driver 102 may control the lights 104 to provide the user with both ambient lighting conditions within the shower space and information corresponding to the conditions of the showerhead 100.

In some embodiments, the condition may be a water temperature. The light driver 102 may be configured to receive a signal corresponding to water temperature of the water flowing through the showerhead 100 from the temperature sensor 112. The light driver 102 may be configured to determine the water temperature based on the signal from the temperature sensor 112 (e.g., using the known relationship of the change in temperature to the change in voltage of the signal). The light driver 102 may be configured to generate a control signal for at least some of the plurality of lights 104 to modify a state of the lights 104 based on the determined water temperature. In some embodiments, the light driver 102 may be configured to change a color of light output from the plurality of lights 104 as the water temperature changes. Hence, the state may be a color of the light output from the plurality of lights 104. For instance, the light driver 102 may store (e.g., in memory 108) various relationships of particular colors with particular temperatures or temperature ranges. As the water temperature increases (as reflected by the signal from the temperature sensor 112), the light driver 102 may generate control signals for the lights 104 to transition between various colors corresponding to the water temperature.

As an example, where the water temperature is below a first threshold (e.g., 55° F.), the light driver 102 may generate a control signal for the lights 104 to output a blue colored light (to indicate the water temperature is cold). As the water temperature increases, the light driver 102 may transition from blue colored light to green colored light (e.g., at 65° F.), from green colored light to yellow colored light (e.g., at 85° F.), from yellow colored light to orange colored light (e.g., at 95° F.), and from orange colored light to red colored light (e.g., in excess of 115° F.). While these thresholds are provided, it is noted that the thresholds and corresponding colored light may change. For instance, the light driver 102 may be configured to generate control signals for the lights 104 which cause the lights 104 to transition between outputting daylight to cool to warm white light to indicate increases in water temperature. Such embodiments may indicate when the shower is "ready" for use by modifying a color of the light output from the lights 104 based on the water temperature. As such, continuing the previous example, a user may determine whether the water temperature is cold (e.g., based on the light being blue), the water temperature is optimal or preferred to the user (e.g., based on the light being yellow or orange), or where the water temperature is too hot (e.g., based on the light being red).

In some embodiments, the condition may be a shower duration. As stated above, the light driver 102 may include a clock 106. The clock 106 may be, for instance, a clock circuit configured to generate a synchronous, recurring signal which may be used for measuring a duration. The light driver 102 may be configured to measure the duration from a shower start time. The shower start time may be a time in which a user turns on the showerhead 100 by opening a valve, such as an electronic, manual, diverter, or other type of valve between the water source 200 and the showerhead 100, which causes water to flow from the water source 200, through the showerhead 100 and out of the water outlets 202 into the shower space). The light driver 102 may be configured to determine the time in which the user turns on the showerhead 100 based on the turbine(s) within the hydro-generator 114 being turned (e.g., as water flowing through the showerhead 100 causes the turbines(s) to rotate within the hydro-generator 114 to produce power). In some embodiments, the showerhead 100 may include an inline flow meter (e.g., configured to detect or measure water flow from the water source 200 through the showerhead 100). The light driver 102 may be configured to determine the shower start time based on data from the flow meter which indicates that water is flowing through the showerhead 100. In some embodiments, the shower start time may be a time in which the shower is "ready" for use by a user. The light driver 102 may be configured to determine the shower start time based on the water temperature being in a particular temperature range (e.g., above a particular water temperature, for instance). The light driver 102 may be configured to maintain a count (e.g., corresponding to the synchronous signal from the clock 106) starting from the shower start time. Hence, the light driver 102 may be configured to use the synchronous signal from the clock 106 as a timer for determining a shower duration starting from the shower start time.

The light driver 102 may include, maintain, or otherwise access a duration threshold. The duration threshold may be stored on memory 108. The duration threshold may be predetermined (e.g., by a manufacturer of the showerhead 100), may be selectable or adjustable by a user (e.g., via an application on a mobile device of the user, via buttons or switches on the showerhead 100, etc.). The duration threshold may be a threshold corresponding to a duration of time which has elapsed between the shower start time and a current time. The duration threshold may be, for instance, three minutes, five minutes, eight minutes, 10 minutes, 20 minutes, etc.

The light driver 102 may be configured to generate a control signal for at least some of the lights 104 based on the shower start time. In some embodiments, the light driver 102 may be configured to generate a control signal to successively activate and deactivate the lights 104 (e.g., to blink the lights 104) as the duration of the shower from the shower start time increases. In some embodiments, the light driver 102 may be configured to increase a blink rate (e.g., a rate at which the lights 104 switch between on and off") as the duration of the shower increases. In some embodiments, the light driver 102 may be configured to increase a blink rate as the duration of the shower approaches the duration threshold. In such embodiments, the light driver 102 may generate a control signal for the lights 104 to blink the lights 104 at a blink rate according to the shower duration to convey to a user a duration in which the shower has been running.

Referring now to FIG. 1 and FIG. 4-FIG. 11, the light driver 102 may be configured to convey the shower duration and temperature in various different manners. Specifically, FIG. 4-FIG. 11 depict several views of alternative implementations of the showerhead 100. As described above, the light driver 102 may be configured to control various lights 104 of the showerhead 100 to provide ambient lighting conditions as well as convey various information to a user. The lights 104 may be arranged around the shower face 204, the lights 104 may backlight the water outlets 202, the lights 104 may be separate from the water outlets 202, and so forth. Various implementations are described in greater detail below. However, the present disclosure is not limited to any particular implementation.

Figure 4:
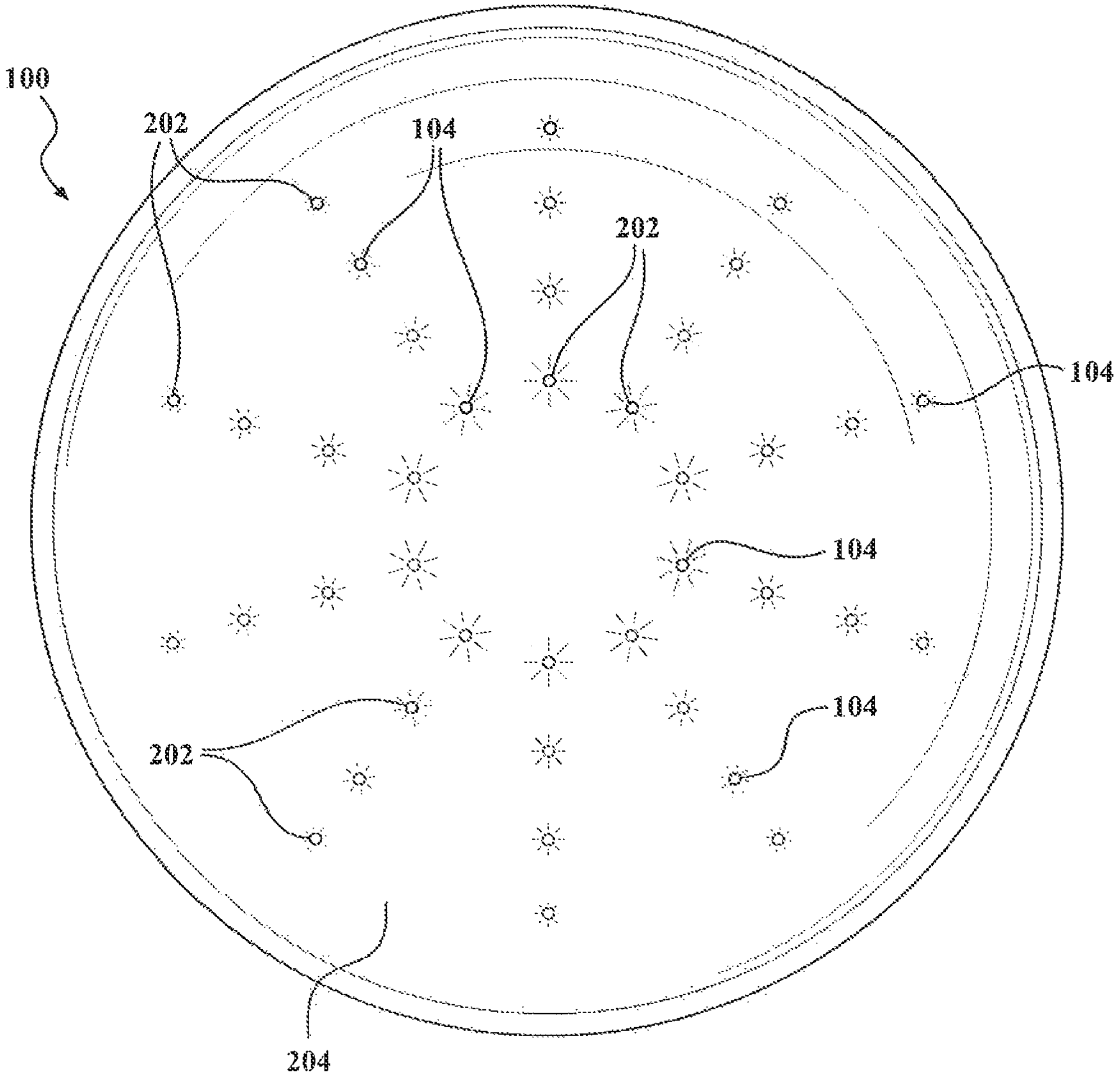
FIGS. 4-11 show front views of alternative implementations of a shower face of the showerhead of FIG. 1, according to illustrative embodiments.
Figure 5:
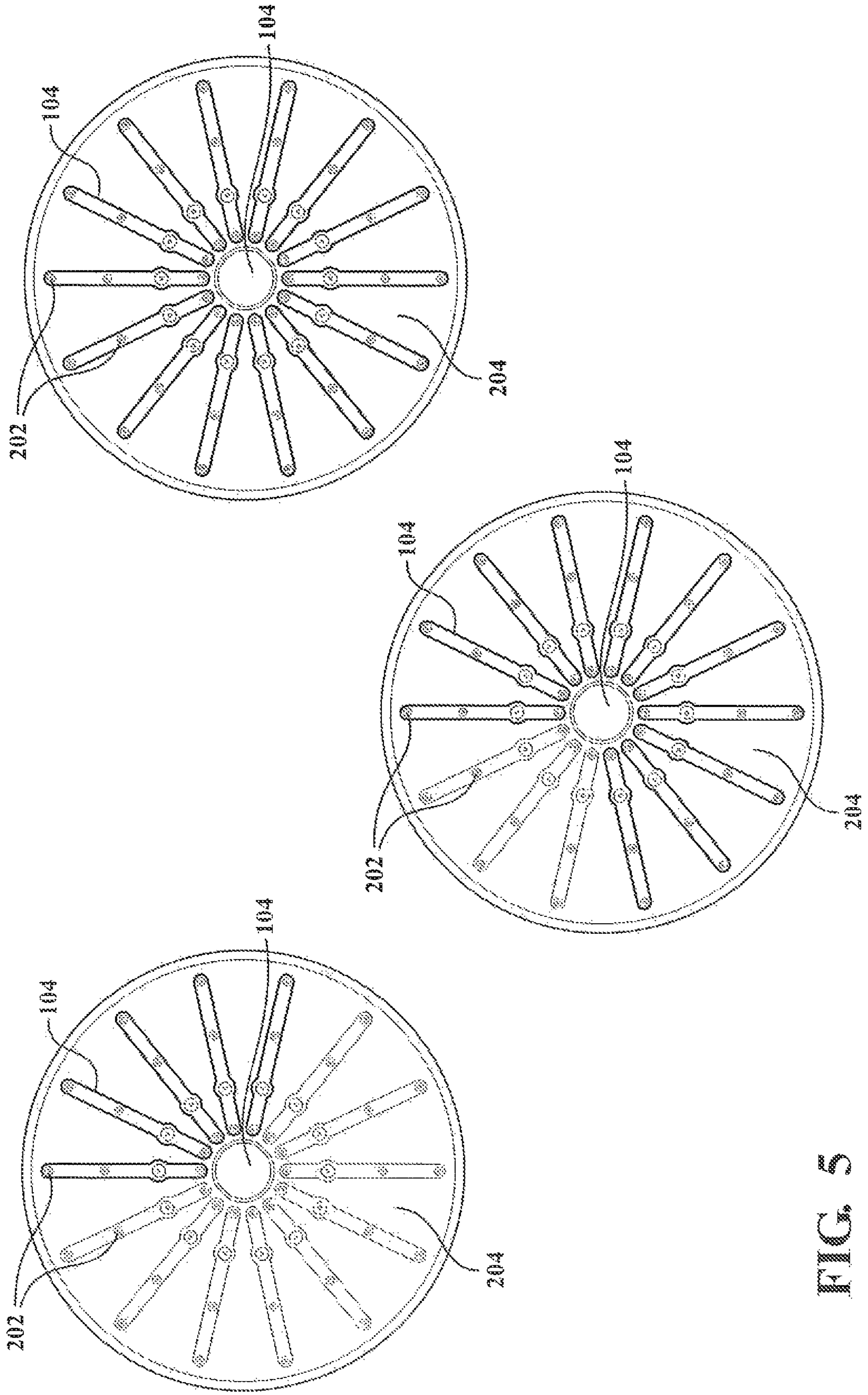
Figure 9:
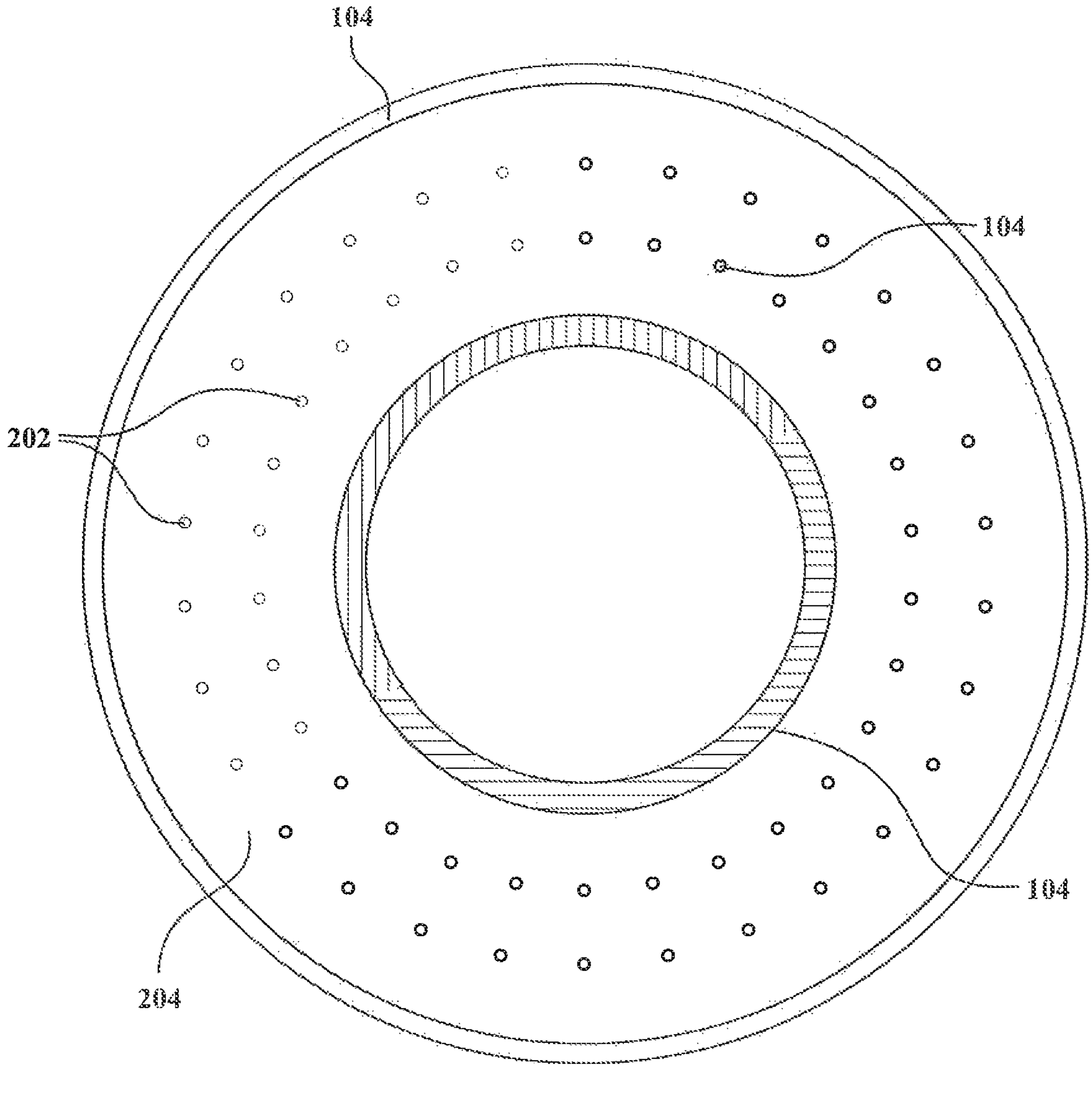
Figure 10:
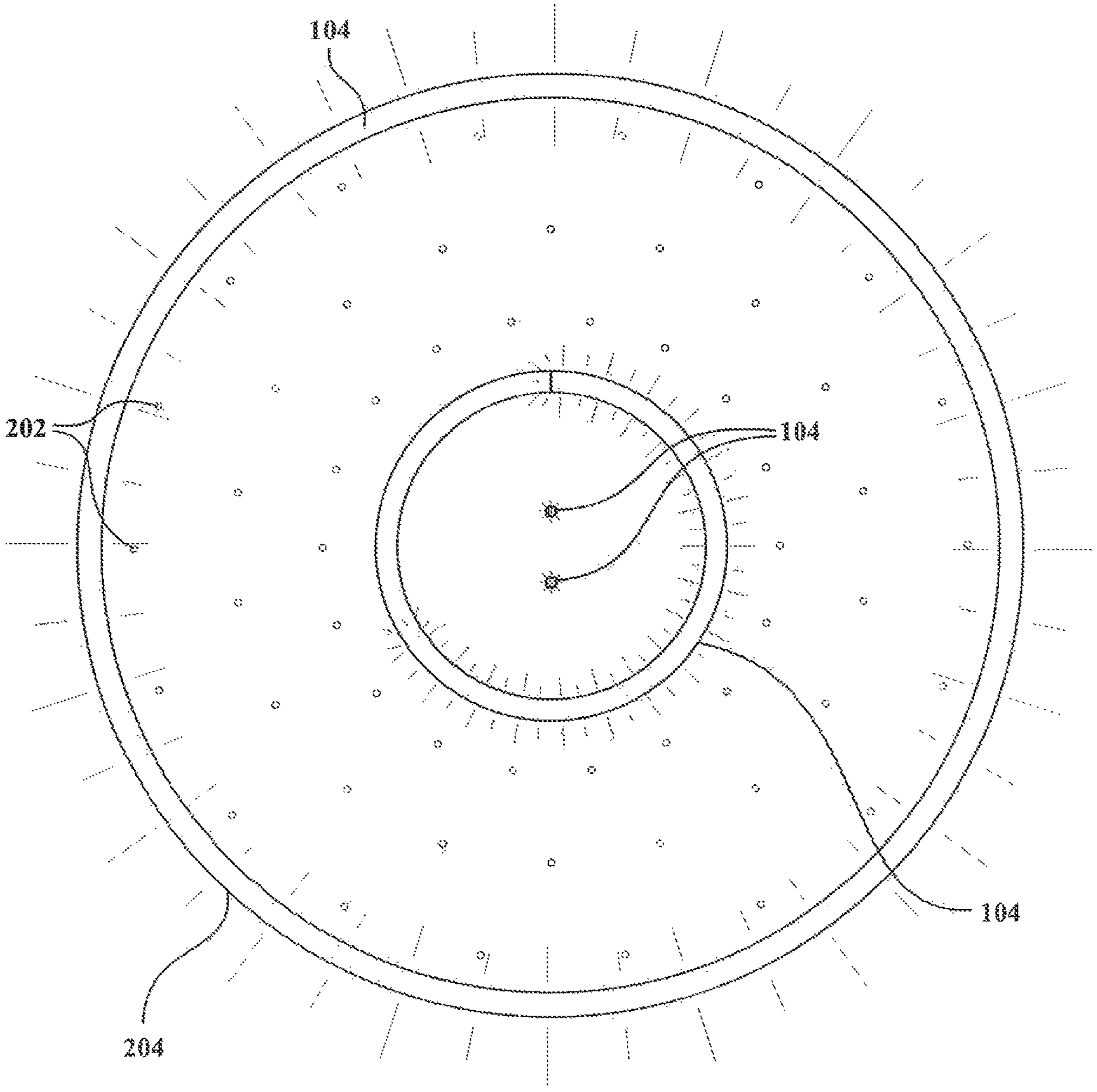

In some embodiments, and as shown in FIG. 4-FIG. 7 and FIG. 9-FIG. 11, the light driver 102 may be configured to generate a control signal to successively activate (or deactivate) lights 104 based on the duration of the shower. For instance, and as shown in FIG. 5 and FIG. 9-FIG. 11, the light driver 102 may be configured to generate a control signal to activate lights 104 in a clockwise (or counterclockwise) fashion as the duration of the shower increases. As one example, in the progression depicted in FIG. 5, the lights driver 102 may be configured to generate a control signal 104 to activate light 104 strips (or linear groups of lights as shown in FIG. 4) in a clockwise fashion as the duration of the shower increases. For example, the light 104 strip at the "12 o'clock" position may first light up, and successive light 104 may light up sequentially as the shower proceeds. The light driver 102 may be configured to generate a control signal for one or more central lights 104 to modify a color (or warmth) of the light outputted therefrom, to convey a temperature of water flowing through the showerhead 100. For instance, the light driver 102 may be configured to generate a control signal for the central light(s) 104 to change the color or warmth of the individual lights 104 (e.g., as shown in FIG. 10), a light 104 ring (as shown in FIG. 5 and FIG. 9), etc. to convey a temperature of water flowing through the showerhead 100 as described above.

Figure 6:
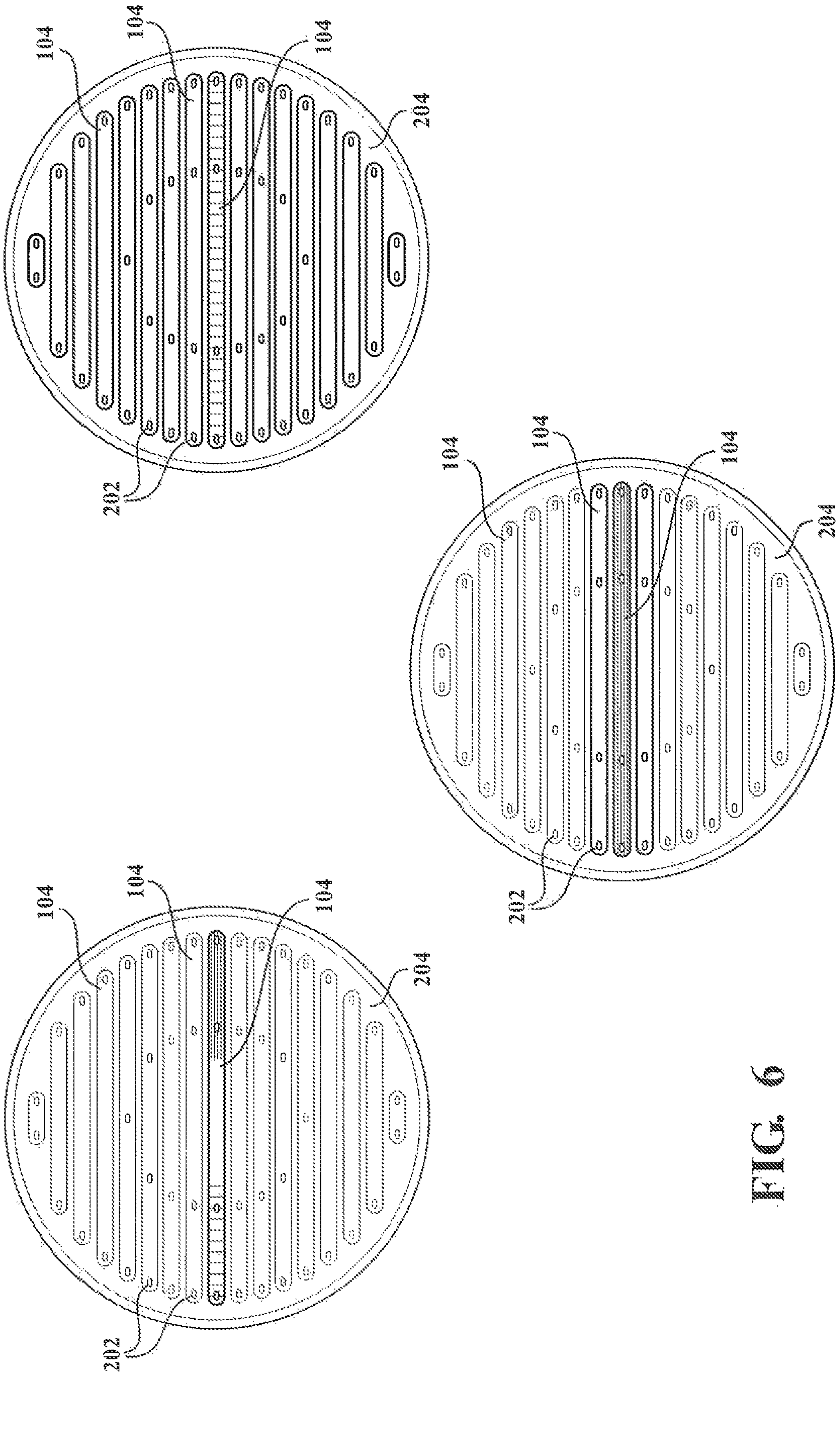
Figure 7:
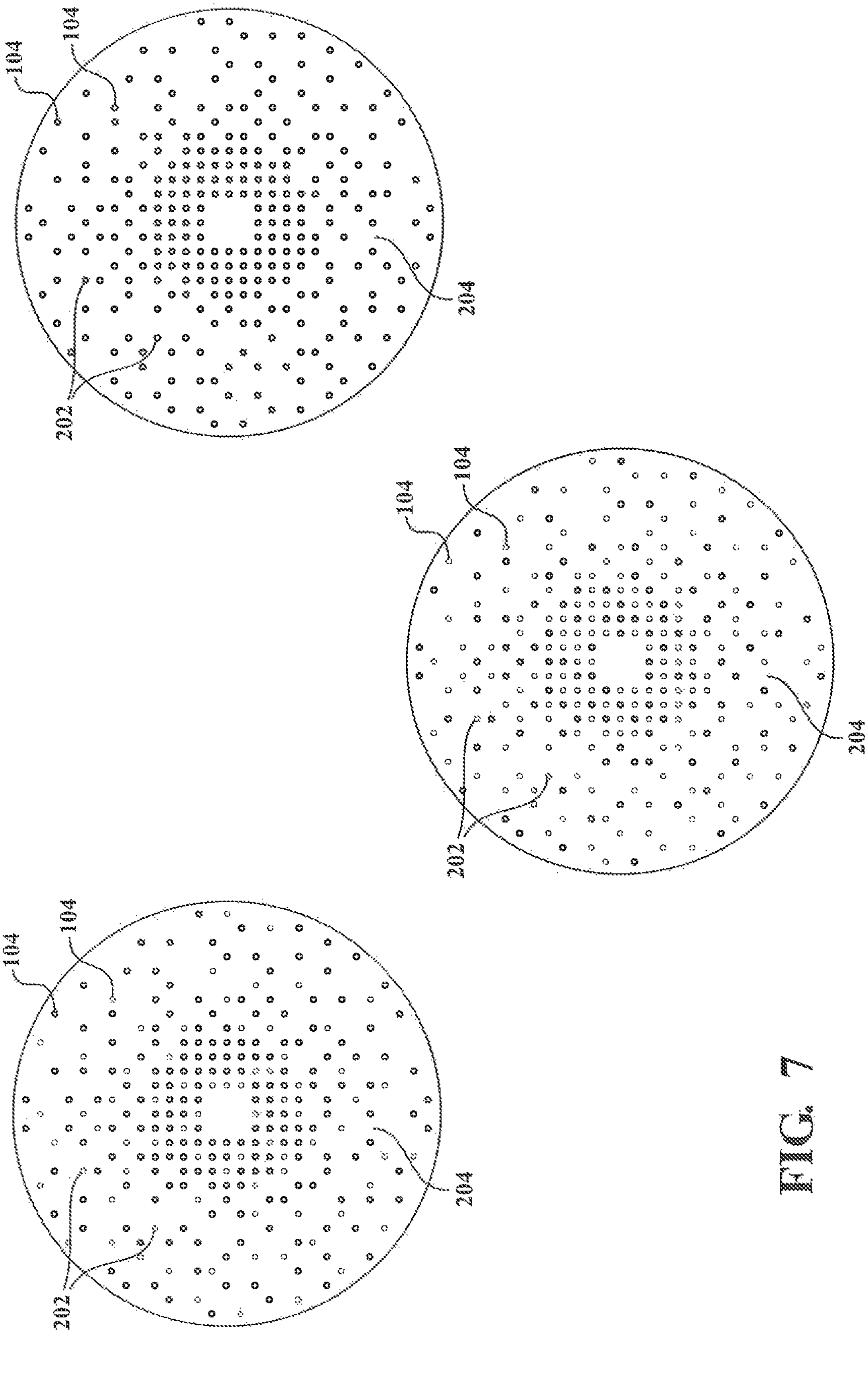

In some embodiments, and as shown in FIG. 6 and FIG. 7, the light driver 102 may be configured to serially activate lights 104. The light driver 102 may be configured to serially activate lights 104 in proportion to the shower duration in comparison to the duration threshold. As one example, and as shown in the progression depicted in FIG. 6, the light driver 102 may be configured to serially activate light 104 strips arranged parallel along the shower face 204 as the duration of the shower increases, and the light driver 102 may be configured to modify a color or warmth of a central strip to convey a temperature of the water flowing through the showerhead 100. As another example, and as shown in the progression depicted in FIG. 7, the light driver 102 may be configured to generate an initial control signal to activate a subset of the lights 104 to output light (e.g., with a first warmth or color) when the light driver 102 identifies or determines the shower start time. As the shower duration increases, the light driver 102 may successively increase the number of the subset of lights 104 which output light in proportion to the shower duration. Similarly, as the water temperature increases, the light driver 102 may modify the warmth or color of the lights 104 which are activated to convey the temperature.

Figure 8:
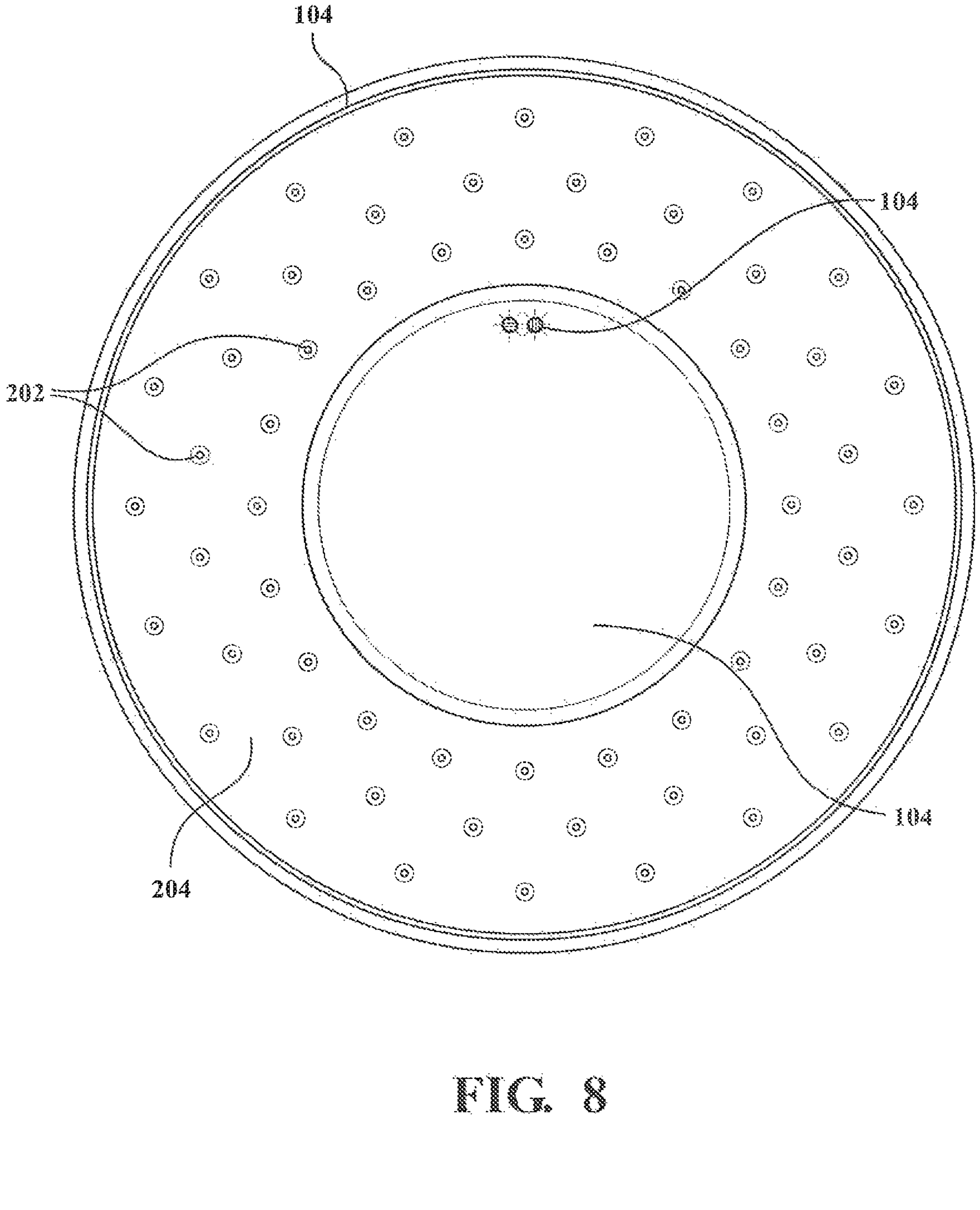

In some embodiments, and as shown in FIG. 8, the light driver 102 may be configured to control a plurality of lights 104 arranged in a central portion of the shower face 204 based on the shower duration. For instance, the light driver 102 may be configured to control lights 104 arranged in the central portion of the shower face 204 to show light "ascending" (or gradually illuminating the central portion) to convey the shower duration. Similarly, the light driver 102 may be configured to generate a control signal to illuminate a particular light 104 (e.g., located at or near the top of the central portion) to indicate a water temperature.

While these examples are shown, it is noted that various other configurations, embodiments, or other implementations may be provided on the shower face 204 to convey information corresponding to shower duration and/or shower water temperature. According to such embodiments, the lights 104 provide both ambient lighting conditions within the shower space and provide information corresponding to conditions of the shower to the user. Such implementations and embodiments may conserve water by prompting a user when the water temperature is sufficient to avoid a user waiting an extended duration to enter the shower space. Furthermore, such implementations and embodiments may conserve water by reminding a user of the duration in which the user is using the shower, which may cause the user to take shower duration showers, exit the shower earlier, etc.

In some embodiments, the condition may be a time of day in which a user turns on the showerhead 100. The light driver 102 may be configured to determine the time of day using data from the clock 106. The light driver 102 may be configured to use the current time of day for modifying various ambient lighting conditions of the shower. For instance, the light driver 102 may be configured to determine whether the current time of day is in the morning, in the afternoon, or in the evening. The light driver 102 may be configured to generate control signals for the lights 104 based on the current time of day. As one example, where the light driver 102 determines the current time of day is morning, the light driver 102 may be configured to generate a control signal to cause the lights 104 to output light in the cool or daylight white light spectrum to provide an invigorating effect to the user to assist the user in waking up. As another example, where the light driver 102 determines the current time of day is evening, the light driver 102 may be configured to generate a control signal to cause the lights 104 to output light in the warn white light spectrum to calming effect to the user to assist the user in going to bed.

In some embodiments, the light driver 102 may be configured to generate control signals to cause the lights 104 to change the warmth of light emitted into the shower space based on the time of day and in proportion to the shower duration. For example, where the light driver 102 determines the current time of day is morning, the light driver 102 may be configured to generate a control signal to cause the lights 104 to output light in the warm white light spectrum at the shower start time and may transition from the warm light spectrum to the cool white light spectrum and from the cool white light spectrum to the daylight white light spectrum as the shower duration increases. Such implementations may provide an invigorating effect to the user to assist the user in waking up. As another example, where the light driver 102 determines the current time of day is evening, the light driver 102 may be configured to generate a control signal to cause the lights 104 to output light in the daylight white light spectrum at the shower start time and may transition from the daylight light spectrum to the cool white light spectrum and from the cool white light spectrum to the warm white light spectrum as the shower duration increases. Such implementations may provide a calming effect to the user to assist the user in going to bed.

In some embodiments, the light driver 102 may include a communications interface 110. The communications interface 110 may be any device(s) or component(s) designed or implemented to facilitate wireless communication between the light driver 102 and one or more external components. The communications interface 110 may facilitate receipt of communications from an external source. For instance, the communications interface 110 may couple the light driver 102 to a wireless network within a house of a user (e.g., local network, such as a Wi-Fi network, for instance). Through connecting to the wireless network, the light driver 102 may be coupled to a server corresponding to an application on a mobile device of a user. As another example, the communications interface 110 may couple the light driver 102 directly to a mobile device of a user (e.g., via a Bluetooth connection).

In some embodiments, various settings of the showerhead 100 may be configurable by a user. The light driver 102 may be configured to receive programmable settings in a communication received from a mobile device of a user via the communications interface 110 (e.g., via the Bluetooth connection facilitated by the communications interface 110 from the mobile device, via the Wi-Fi connection facilitated by the communications interface 110 from a server corresponding to an application on the mobile device, etc.). In some embodiments, the programmable settings may include color schemes (e.g., various combinations of colors which are intended to replicate, simulate, or otherwise correspond to colors found in various environments, such as in the rain forest, dessert, artic, etc.), light preferences (e.g., preferred manner in which the lights 104 relay shower duration, preferred colors for indicating water temperature, etc.), preferred temperatures (e.g., a threshold temperature or threshold temperature range in which the shower is deemed to be "ready" for use), preferred shower durations (e.g., a number of minutes), etc. The light driver 102 may be configured to store these programmable settings in memory 108. The light driver 102 may be configured to generate control signals for the lights 104 to output light based on the detection conditions of the showerhead 100 and the programmable settings for the shower.

Figure 12:
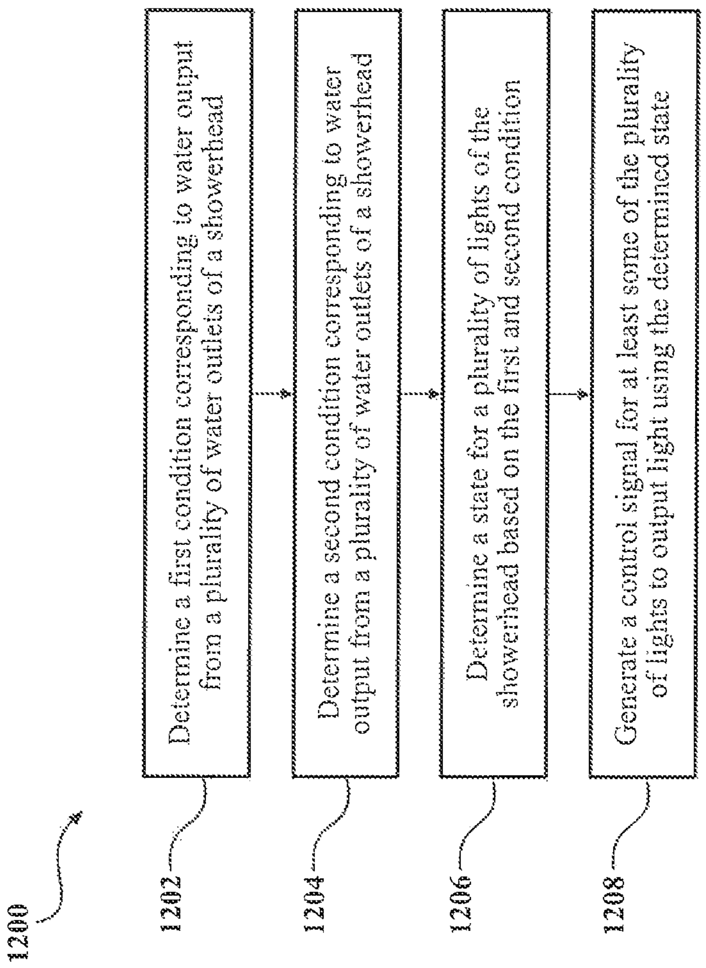
FIG. 12 shows a flowchart showing a method of providing lighting in a shower space, according to an illustrative embodiment.

Referring now to FIG. 12, depicted is a flowchart showing a method 1200 of providing lighting in a shower space, according to an illustrative embodiment. The method 1200 may be implemented by the components described above with reference to FIG. 1 through FIG. 3. As a brief overview, at step 1202, a light driver 102 determines a first condition corresponding to a showerhead 100. At step 1204, the light driver 102 determines a second condition corresponding to the showerhead 100. At step 1206, the light driver 102 determines a state for a plurality of lights 104 of the showerhead 100 based on the first and second condition. At step 1208, the light driver 102 generates a control signal for at least some of the plurality of lights 104 to output light using the determined state.

At step 1202, and in some embodiments, a light driver 102 determines a first condition corresponding to a showerhead 100. In some embodiments, the first condition may be a water temperature, a shower start time (e.g., a time in which a user turns on the showerhead 100, a time in which the water temperature meets a threshold temperature), a time of day in which the showerhead 100 is turned on, shower duration, etc. The light driver 102 may determine the first condition based on data from the temperature sensor 112 of the showerhead 100, based on data from the clock 106 of the light driver 102, etc. The light driver 102 may determine the condition based on data from the temperature sensor 112 and/or clock 106 in comparison to data from memory 108 (e.g., predetermined or customized settings for water temperature, shower duration, etc.).

At step 1204, and in some embodiments, the light driver 102 determines a second condition corresponding to the showerhead 100. Step 1204 may be similar in some respects to step 1202. The second condition may be different from the first condition. As one example, the first condition may be water temperature and the second condition may be shower duration. As another example, the first condition may be shower start time and the second condition may be time of day. As yet another example, the first condition may be time of day and the second condition may be water temperature. Hence, various combinations of conditions may be determined by the light driver 102 which correspond to the showerhead 100. The light driver 102 may use the first and second condition for generating control signals for lights 104 of the showerhead 100, as described in greater detail below.

At step 1206, and in some embodiments, the light driver 102 determines a state for a plurality of lights 104 of the showerhead 100 based on the first and second condition (e.g., determined at step 1202 and step 1204). The light driver 102 may cross-reference the conditions with data stored in memory 108. For instance, memory 108 may include a table including various conditions or ranges of conditions and corresponding states of the lights 104. For instance, the table may include various colors for which the lights 104 are to output light and corresponding water temperatures (or temperature ranges) to indicate when the shower is ready for use. The light driver 102 may use data from the temperature sensor 112 to perform a look-up function in the table to determine a corresponding color for the water temperature of the water flowing through the showerhead 100. As another example, the table may include various warmth transitions for which the lights 104 are to output light and corresponding times of day. The light driver 102 may use data from the clock 106 to perform a look-up function in the table to determine a corresponding warmth transition for the time of day in which the user turned on the showerhead 100. In some implementations, the light driver 102 may determine a state of the lights 104 based on a shower duration. The light driver 102 may store a threshold duration (which may be predetermined, may be configurable by a user, etc.) corresponding to a preferred maximum shower duration. The light driver 102 may determine a state of the lights 104 based on a comparison of the shower duration (e.g., an amount of time elapsed from the shower start time to a current time) to the threshold duration.

At step 1208, and in some embodiments, the light driver 102 generates a control signal for at least some of the plurality of lights 104 to output light using the determined state (e.g., determined at step 1206). The light driver 102 may generate a control signal to cause the lights 104 to output light according to the state. The light driver 102 may transmit the control signal to the lights 104 to cause the lights 104 to turn on or off, to change a warmth of the white light, to change a color of the light, etc.

In some embodiments, the light driver 102 may determine a state of the lights 104 (e.g., at step 1206) and generate control signals for the lights 104 (e.g., at step 1208) to output light based on various combinations of the conditions detected at step 1202 and step 1204. For instance, the light driver 102 may determine both a color (or warmth) for the lights 104 (e.g., a first state) based on a water temperature, and an on/off state to blink the lights 104 (e.g., a second state) based on a shower duration. The light driver 102 may generate a control signal that causes the lights 104 to output light having the determined color or warmth (e.g., the first state) and to blink on and off (e.g., the second state) to convey both a shower temperature and a shower duration, as well as to provide ambient lighting conditions in the shower space. Similarly, the light driver 102 may determine both a color or warmth for the lights 104 (e.g., a first state) based on a water temperature, and an on/off state for a subset of the lights 104 (e.g., a second state) based on a shower duration. The light driver 102 may generate a control signal that causes the lights 104 to output light having the determined color or warmth (e.g., the first state) and to successively turn on lights 104 (e.g., the second state) to convey both a shower temperature and a shower duration, as well as to provide ambient lighting conditions in the shower space.

In some embodiments, the light driver 102 may determine a series of states for the lights 104 based on various combinations of the conditions. For instance, when the showerhead 100 is turned on, the light driver 102 may determine a first state for the lights 104 based on water temperature (e.g., to indicate to the user when the shower is ready to use). The light driver 102 may generate a control signal for the lights 104 to cause the lights 104 to output light having a color which changes with the water temperature (e.g., blue to green to yellow to orange to red as the water temperature increases, for instance). Hence, the first state may be a particular color or color spectrum. Once the water temperature satisfies a temperature threshold (or threshold range), the light driver 102 may then determine another state, such as a warmth of the white light from the lights 104 based on a time of day in which the showerhead 100 was turned on. Accordingly, the state may switch between the first state (e.g., a particular color) and the second state (e.g., a particular warmth of the white light). As an example, where the user turns on the shower in the morning, the light driver 102 may identify a wake-up lighting scheme (e.g., a cool or daylight white light, a progression from warm to cool to daylight white light, etc.). The light driver 102 may generate a control signal that causes the lights 104 to output light according to the wake-up lighting scheme (e.g., initially a warm white light at the shower start time following the first state and a progression from warm white light to cool white light to daylight white light as the shower progresses). The light driver 102 may then determine another state for the lights 104 based on a shower duration starting from shower start time. The light driver 102 may generate control signals to cause the lights 104 to blink (e.g., blink the cool or daylight white light corresponding to the time of day) as the shower duration approaches the duration threshold. As such, in some implementations, the light driver 102 may generate control signals that cause the lights 104 to output light having a series of states corresponding to various conditions of the showerhead 100. Thus, the lights 104 provide ambient lighting conditions in the shower space as well as information corresponding to conditions of the showerhead 100.

Figure 13:
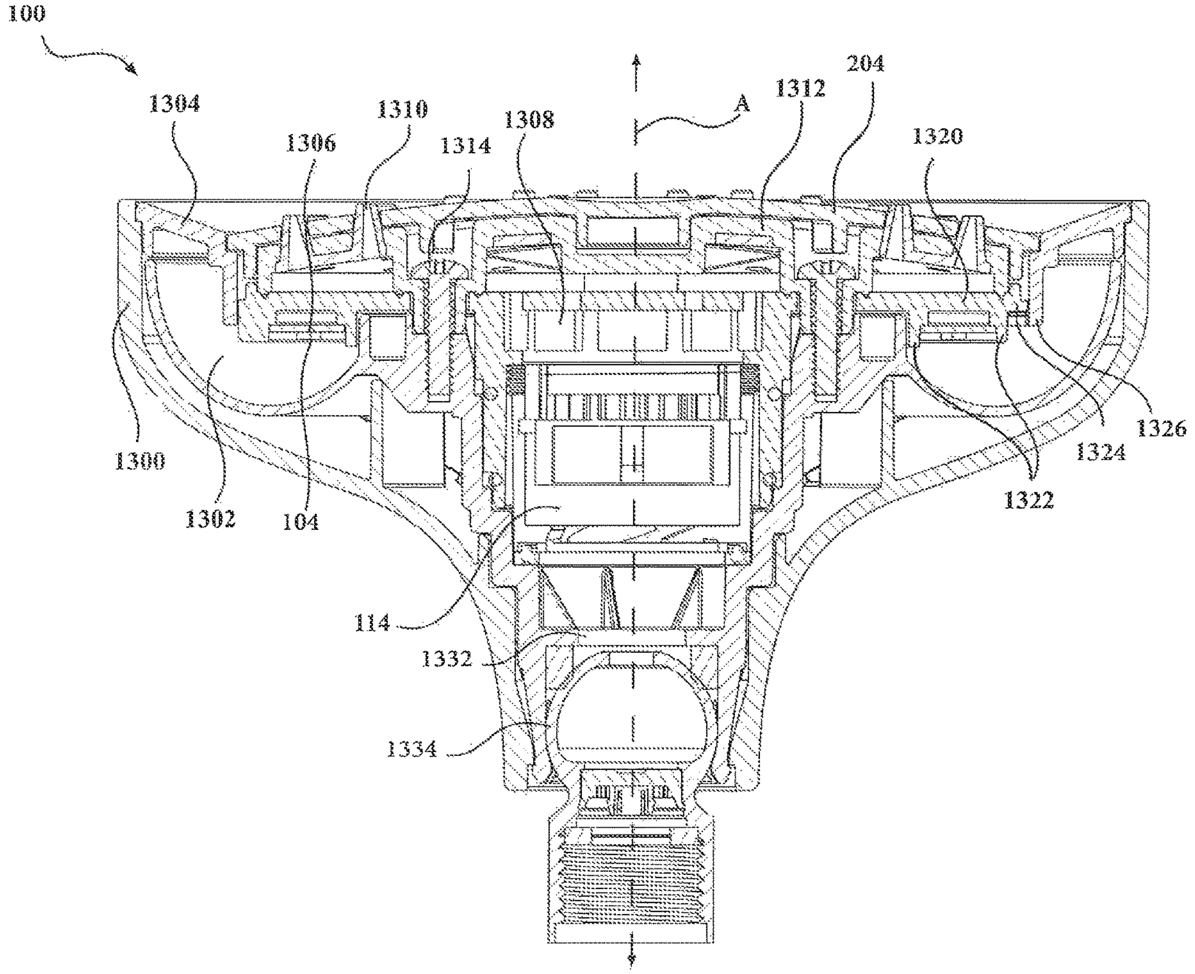
FIG. 13 shows a cross-sectional view of the showerhead of FIG. 1, according to an illustrative embodiment.
Figure 14:
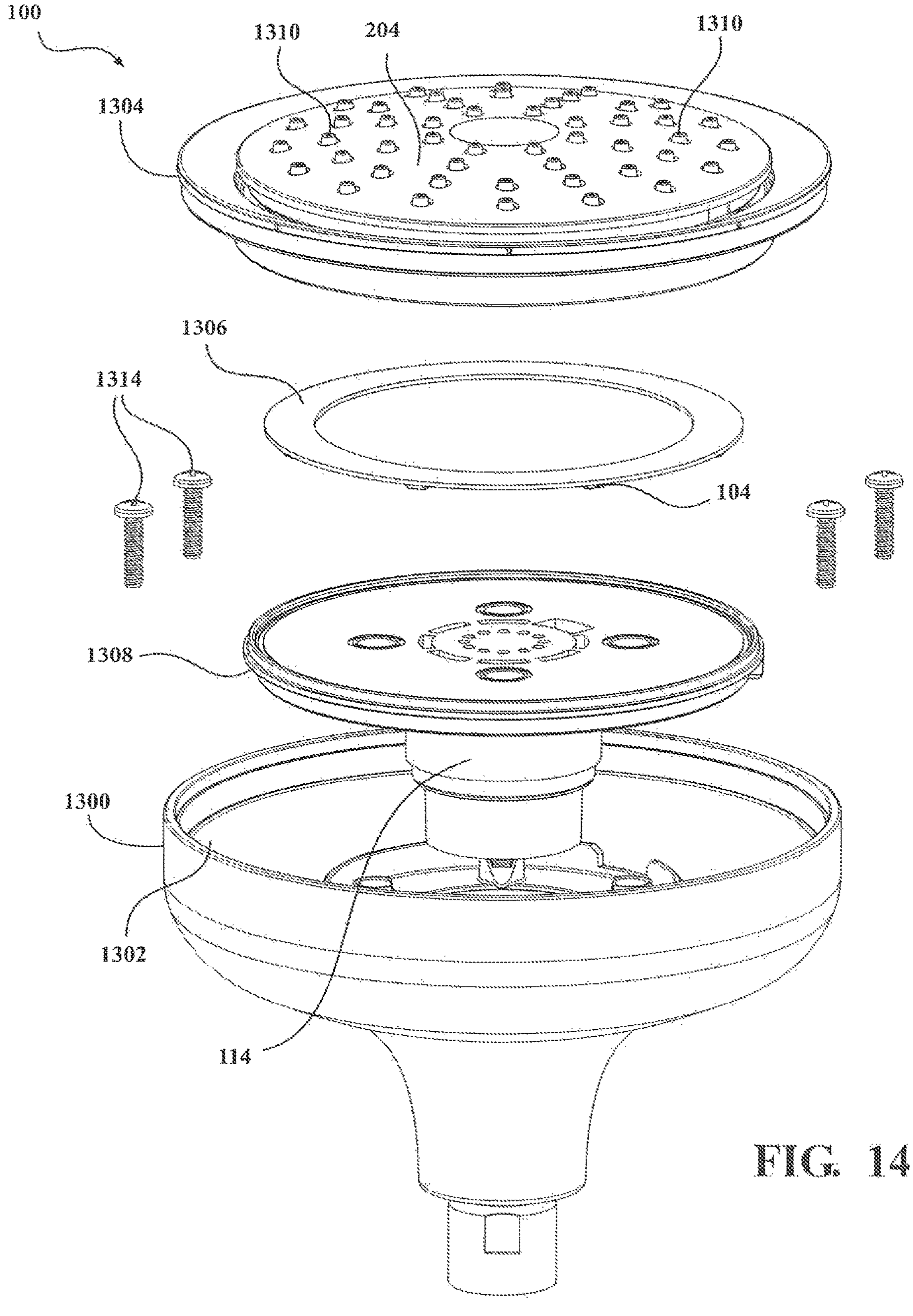
FIG. 14 shows an exploded enhanced view of the showerhead of FIG. 1, according to an illustrative embodiment.
Figure 15:
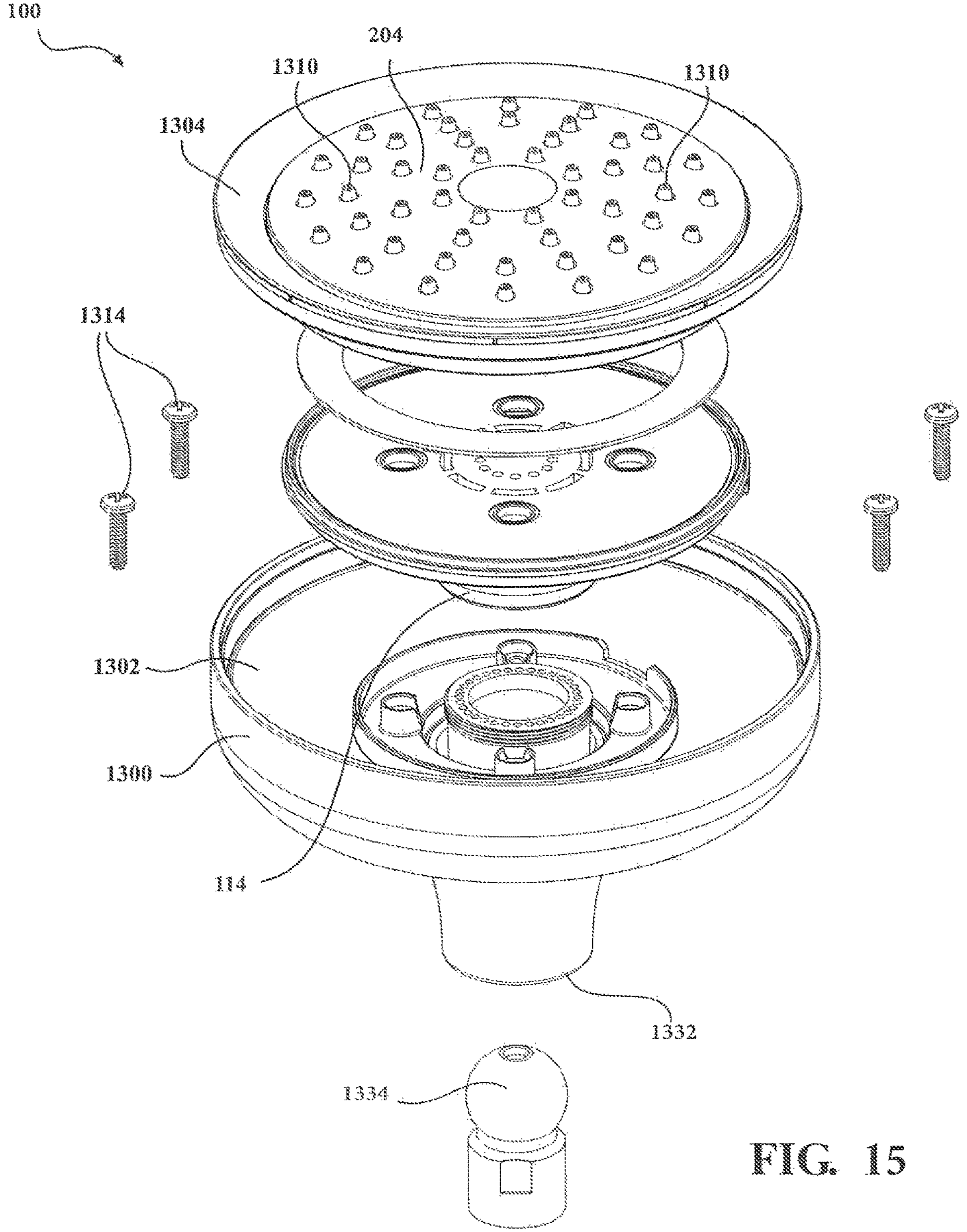
FIG. 15 shows an exploded perspective view of the showerhead of FIG. 1, according to an illustrative embodiment.
Figure 16:
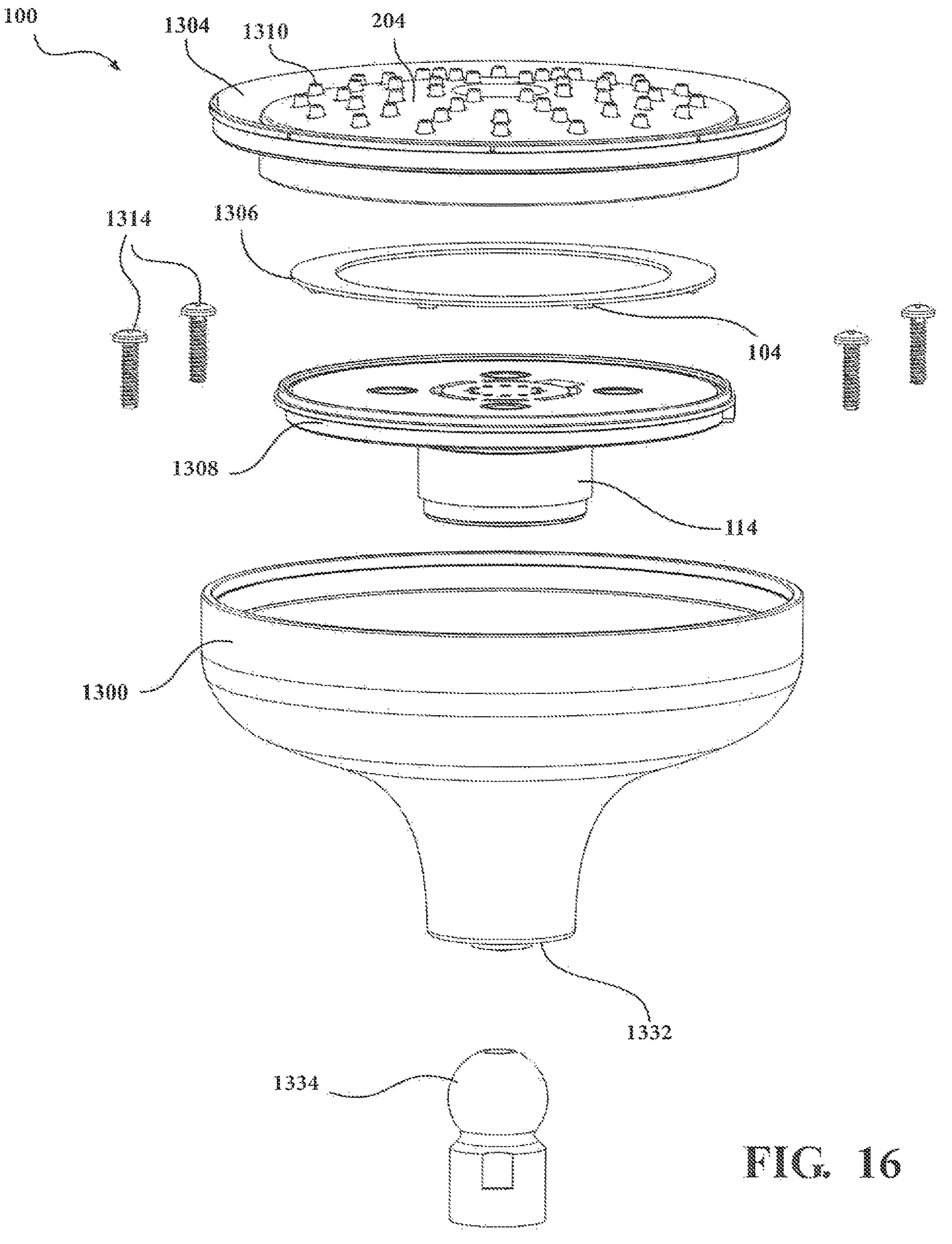
FIG. 16 shows an exploded side view of the showerhead of FIG. 1, according to an illustrative embodiment.

Referring now to FIG. 13-FIG. 16, depicted are views showing internal components of the showerhead 100, according to an illustrative embodiment. Specifically, FIG. 13 shows a cross-sectional view of the showerhead 100, FIG. 14 shows an exploded enhanced view of the showerhead 100, FIG. 15 shows an exploded perspective view of the showerhead 100, and FIG. 16 shows an exploded side view of the showerhead 100, according to illustrative embodiments.

The showerhead 100 is shown to include an outer shell or housing 1300 which houses the components of the showerhead 100. The housing 1300 may define an axis A (shown in FIG. 16) which extends through an inlet 1332 of the housing 1300. The showerhead 100 is shown to include a light reflector 1302, a light diffuser 1304, and a circuit board 1306 having the light driver 102, and plurality of lights 104 arranged thereon. As described above, the lights 104 and circuit board 1306 may be powered by the hydro-generator 114, which is arranged internally to the showerhead 100. Water passing into the showerhead 100 from an inlet may pass through the hydro-generator 114. The water may turn various components (such as turbines, for example) of the hydro-generator 114 to charge a battery, capacitor, or power source which provides power to the lights 104 and the circuit board 1306. Water may egress the hydro-generator 114 and enter a water chamber 1308, and enter a water cavity 1312 which includes or otherwise defines the water outlets 1310 of the showerhead 100.

The circuit board 1306 may include a first face which faces the water outlets 1310 and a second face which faces the light reflector 1302. The lights 104 may be arranged on the second face of the circuit board 1306. As such, the lights 104 may be configured or arranged to direct light in a direction opposite to a direction of water flow from the showerhead 100. For instance, water may flow into the inlet 1332 in a first direction along the axis A, and the lights 104 may be configured to direct light in a second direction (opposite the first direction) extending parallel to the axis A. The lights 104 may be configured or arranged to direct light towards the light reflector 1302. Light emitted from the lights 104 may be directed toward and hit the light reflector 1302. As best shown in FIG. 13, the light reflector 1302 may have a concave surface which reflects light from the lights 104 towards the light diffuser 1304. As such, when light is emitted from the lights 104, the light may hit and be reflected internally by the light reflector 1302 towards the light diffuser 1304. Light may then enter the diffuser 1304. The light may be diffused across the diffuser 1304 and emitted from the diffuser 1304/showerhead 100.

Figure 11:
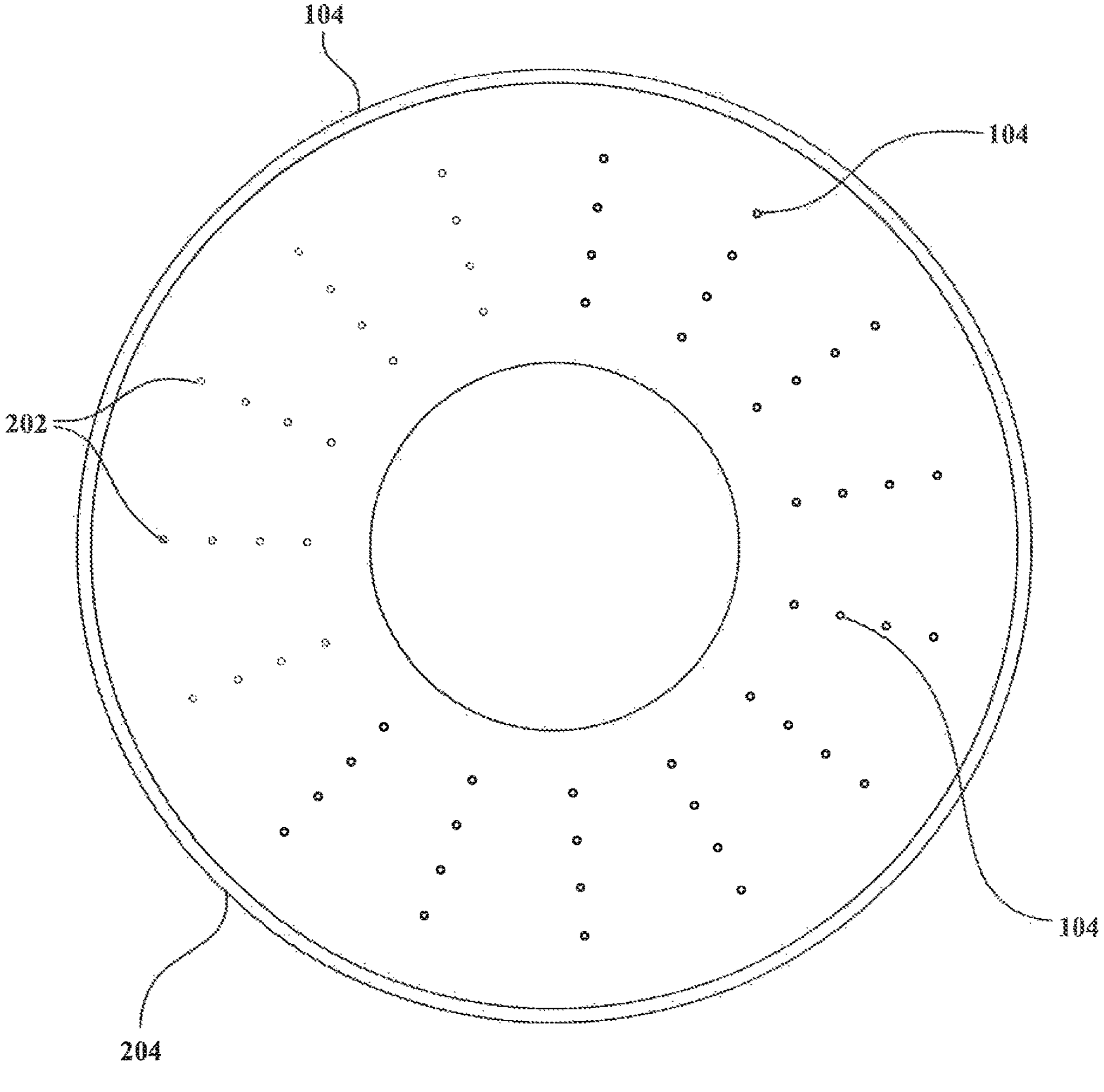

As shown in the embodiment in FIG. 13-FIG. 16, the light diffuser 1304 may extend around or otherwise surround an outer perimeter of the shower face 204. However, in other embodiments, such as those shown in FIG. 4-FIG. 11, the light diffuser 1304 may be incorporated into other portions of the shower face 204 such as around individual water outlets (as shown in FIG. 4, FIG. 9, and FIG. 11), within channels arranged or extending radially from a center of the shower face 204 (as shown in FIG. 5), linearly or parallel to one another (as shown in FIG. 6), or in other various arrangements as shown in FIG. 4-FIG. 11.

The showerhead 100 may be assembled by pushing, press-fitting, or otherwise inserting the light reflector 1302 into an inner cavity of the showerhead 100 formed by the outer housing 1300. It is noted that, while the showerhead 100 is assembled by assembling internal components of the showerhead 100 then press-fitting the outer housing 1300 to the internal components, which may ensure the aesthetic integrity of the user-facing components of the showerhead 100. However, continuing this example, once the light reflector 1302 is arranged in the inner cavity of the showerhead 100, the hydro-generator 114 may be inserted into a center portion of the inner cavity upstream from the inlet of the showerhead 100. As shown in FIG. 13, the light reflector 1302 may surround the hydro-generator 114 when the hydro-generator 114 is arranged in the center portion of the inner cavity of the showerhead 100. The hydro-generator 114 may be arranged with the water chamber 1306 coupled to an egress end of the hydro-generator 114, and the water cavity 1312 may be coupled to an egress end of the water chamber 1306. As such, water may flow from the hydro generator 114 and enter the water chamber 1306, and water from the water chamber 1306 may flow through the water cavity 1312 and out of the water outlets 1310. In some embodiments, and as shown in FIG. 13-FIG. 16, the water chamber 1306, hydro-generator 114, and various other components may be coupled to the outer housing 1300 via one or more fasteners 1314.

As best shown in FIG. 13, the water chamber 1308 may include an outer perimeter portion 1320 which extends outwardly towards the light reflector 1302. The outer perimeter portion 1320 may include extenders 1322 which extend outwardly from the outer perimeter portion 1320 and towards the light reflector 1302. The extenders 1322 may form a channel which receives the circuit board 1306. The circuit board 1306 may be inserted into the channel and fixed, adhered, or otherwise coupled to the outer perimeter portion 1320. The circuit board 1306 may be arranged within the channel such that the lights 104 direct light in a direction which is parallel to the extenders 1322 (e.g., towards the light reflector 1302).

The water chamber 1308 is shown to be fluidically coupled to the water cavity 1312. The water cavity 1312 may include the plurality of nozzles (or other water outlets 1310) formed thereon. The outer perimeter portion 1320 of the water chamber 1308 may include a lipped end 1324 which is at least partially formed by the outermost extender 1322. The lipped end 1324 may have an "L" shape which is configured to interface with an "L" shaped end portion 1326 of the light diffuser 1304. The light diffuser 1304 may therefore be inserted and maintained in place by the interface between the lipped end 1324 and end portion 1326 of the light diffuser 1304. Once the light diffuser 1304 is inserted and maintained in place within the inner cavity of the housing 1300, the water cavity 1312 may be inserted on top of the water chamber 1308. The water cavity 1312, water chamber 1308, and hydro-generator 114 may be fastened to the housing 1300 via one or more fasteners 1314 as shown in FIG. 13. As such, water cavity 1312 may then be fastened, adhered, or otherwise coupled to the water chamber 1308 such that water passing through the hydro-generator 114 and into the water chamber 1308 flows into an inner chamber of the water cavity 1312, and out of the water outlets 1310 arranged or otherwise defined by the water cavity 1312. In other words, the water cavity 1312 may be fluidically coupled to the water chamber 1308, which is fluidically coupled to the hydro-generator 114, which is fluidically coupled to an inlet 1332 of the showerhead 100. In some embodiments, the showerhead 100 may include a decorative or aesthetic cover which defines the shower face 204. The cover may be snap-fit, clipped, or otherwise coupled to the water cavity 1312. The cover may include a plurality of through passages in which the water outlets 1310 extend through.

In some embodiments, the showerhead 100 may include a ball joint 1334 arranged at the inlet 1332, as best shown in FIG. 15 and FIG. 16. The ball joint 1334 may provide for rotation and movement of the showerhead 100. An end of the ball joint 1334 which is opposite to the coupling at the inlet 1332 may be coupled to a water source which supplies water to the showerhead 100.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components (such as the light driver) used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the cord management system as shown in the various exemplary embodiments is illustrative only. Additionally, any element disclosed in one embodiment may be incorporated or utilized with any other embodiment disclosed herein. For example, shower face of the exemplary embodiment shown in FIG. 4-FIG. 11 may be incorporated in the exemplary embodiments shown in FIG. 2-FIG. 3 to provide different aesthetic features. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A showerhead comprising:

a plurality of lighting elements; and a light reflector arranged to reflect the light from the lighting elements toward a light diffuser, the light reflector being concavely curved at an incident surface of the light reflector;

wherein the light diffuser is positioned along an external surface of the showerhead and is arranged to diffuse the light from the light reflector along a surface of the light diffuser.

2. The showerhead of claim 1, further comprising:

a plurality of water outlets along a surface of the showerhead, wherein the light diffuser surrounds one or more of the plurality of water outlets.

3. The showerhead of claim 1, wherein the plurality of lighting elements are arranged to output the light along a first axis, and wherein the light reflector is arranged to reflect the light from the lighting elements along one or more second axes towards the light diffuser.

4. The showerhead of claim 3, wherein one of the one or more second axes is parallel to the first axis.

5. The showerhead of claim 1, wherein the plurality of lighting elements are arranged to output the light toward the incident surface of the light reflector, and wherein the concave surface of the light reflector reflects the light from the plurality of lighting elements towards the light diffuser.

6. The showerhead of claim 1, wherein water flows into an inlet of the showerhead in a first direction, and wherein the plurality of lighting elements are arranged to output the light along a second direction opposite the first direction.

7. The showerhead of claim 1, wherein the light diffuser is arranged along a perimeter portion of a shower face of the showerhead.

8. The showerhead of claim 7, further comprising a plurality of water outlets provided in an interior portion of the face of the showerhead, the perimeter portion surrounding the interior portion.

9. The showerhead of claim 1, further comprising a hydro-generator configured to supply power to the plurality of lighting elements.

10. The showerhead of claim 1, wherein the plurality of lighting elements are arranged to output light in a first direction which is different than a second direction of water flow into the showerhead.

11. The showerhead of claim 10, wherein the first direction is substantially parallel to and opposite the second direction.

12. A showerhead comprising:

a housing;

a light reflector arranged along an inner cavity of the housing;

one or more lighting elements arranged to direct light toward the light reflector, the light reflector being concavely curved at an incident surface of the light reflector; and a light diffuser arranged along an external surface of the housing, the light diffuser configured to receive light reflected from the light reflector and to diffuse the light outwardly from the light diffuser.

13. The showerhead of claim 12, wherein the light diffuser diffuses the light along a surface of the light diffuser and outwardly from the light diffuser.

14. The showerhead of claim 12, wherein water flows into the housing through an inlet in a first direction, and wherein the light from the one or more lighting elements is emitted in a second direction which is at least partially parallel to the first direction, and wherein the second direction is opposite the first direction.

15. The showerhead of claim 12, wherein the plurality of lighting elements are arranged to output the light towards the incident surface of the light reflector, and wherein the incident surface reflects the light from the plurality of lighting elements towards the light diffuser.

16. The showerhead of claim 12, further comprising a shower face having a plurality of water outlets, wherein the light diffuser at least partially surrounds at least one of the plurality of water outlets.

17. The showerhead of claim 16, wherein the light diffuser surrounds the shower face including each of the plurality of water outlets.

18. A method of assembling a showerhead, the method comprising:

providing a plurality of lighting elements in an orientation to output light;

providing a light reflector in an interior cavity of a housing of the showerhead, the light reflector arranged to reflect the light from the plurality lighting elements towards a light diffuser, the light reflector being concavely curved at an incident surface of the light reflector; and providing the light diffuser along an external surface of the showerhead, the light diffuser receiving the light from the light reflector and diffusing the light along a surface of the light diffuser.

* * * * *